(12) United States Patent
Wigren

(10) Patent No.: US 7,203,499 B2
(45) Date of Patent: Apr. 10, 2007

(54) POSITION DETERMINATION IN WIRELESS COMMUNICATION SYSTEMS

(75) Inventor: K. Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 729 days.

(21) Appl. No.: 10/146,126

(22) Filed: May 16, 2002

(65) Prior Publication Data

US 2003/0216142 A1   Nov. 20, 2003

(51) Int. Cl.
*H04Q 7/20* (2006.01)
(52) U.S. Cl. .................. 455/456.1; 455/456.3
(58) Field of Classification Search ............ 455/456.1, 455/456.2; 370/335, 342; 701/208; 751/214
See application file for complete search history.

(56) References Cited

U.S. PATENT DOCUMENTS

| | | | |
|---|---|---|---|
| 6,999,780 B1* | 2/2006 | Zhao ...................... | 455/456.5 |
| 2003/0054813 A1* | 3/2003 | Riley et al. .............. | 455/424 |
| 2003/0086512 A1* | 5/2003 | Rick et al. ............... | 375/343 |
| 2003/0148761 A1* | 8/2003 | Gaal ....................... | 455/423 |
| 2004/0189521 A1* | 9/2004 | Smith et al. ............. | 342/387 |
| 2005/0075111 A1* | 4/2005 | Tafazolli et al. ......... | 455/456.1 |

FOREIGN PATENT DOCUMENTS

| WO | 98/10538 | 3/1998 |
|---|---|---|
| WO | 01/10154 A1 | 2/2001 |
| WO | 01/09125 A1 | 3/2001 |

OTHER PUBLICATIONS

Sophia Antipolis, "IPDL Simulations for Time Mask Evaluation," Jan. 28-Feb. 01, 2002, TSG-RAN Working Group 4, Meeting #21, R4-020118.
PCT International Search Report PCT/SE 03/00730.

* cited by examiner

*Primary Examiner*—Temica Beamer
(74) *Attorney, Agent, or Firm*—Nixon & Vanderhye P.C.

(57) ABSTRACT

In the present invention, the altitude is introduced in the positioning determination. Preferably a three-dimensional position determination is performed. The altitude is according to the present invention introduced as additional information in terms of pre-determined geographical altitude data (40). The position determining can take place either in the mobile unit (20) or in any suitable node (10:1) in the wireless communication system (1). A provisional two-dimensional position can also be provided, which is subsequently corrected to a three-dimensional position by use of pre-determined altitude data. The position determination is based on arrival time measurements ($t_1$–$t_3$) of signals (30: 1–30:3) between the mobile unit (20) and base stations (10:1–10:3) of the system (1). Both downlink and uplink signals are possible to use. Round trip time measurements can be used to further reduce the need for several hearable base stations (10:1–10:3).

52 Claims, 12 Drawing Sheets

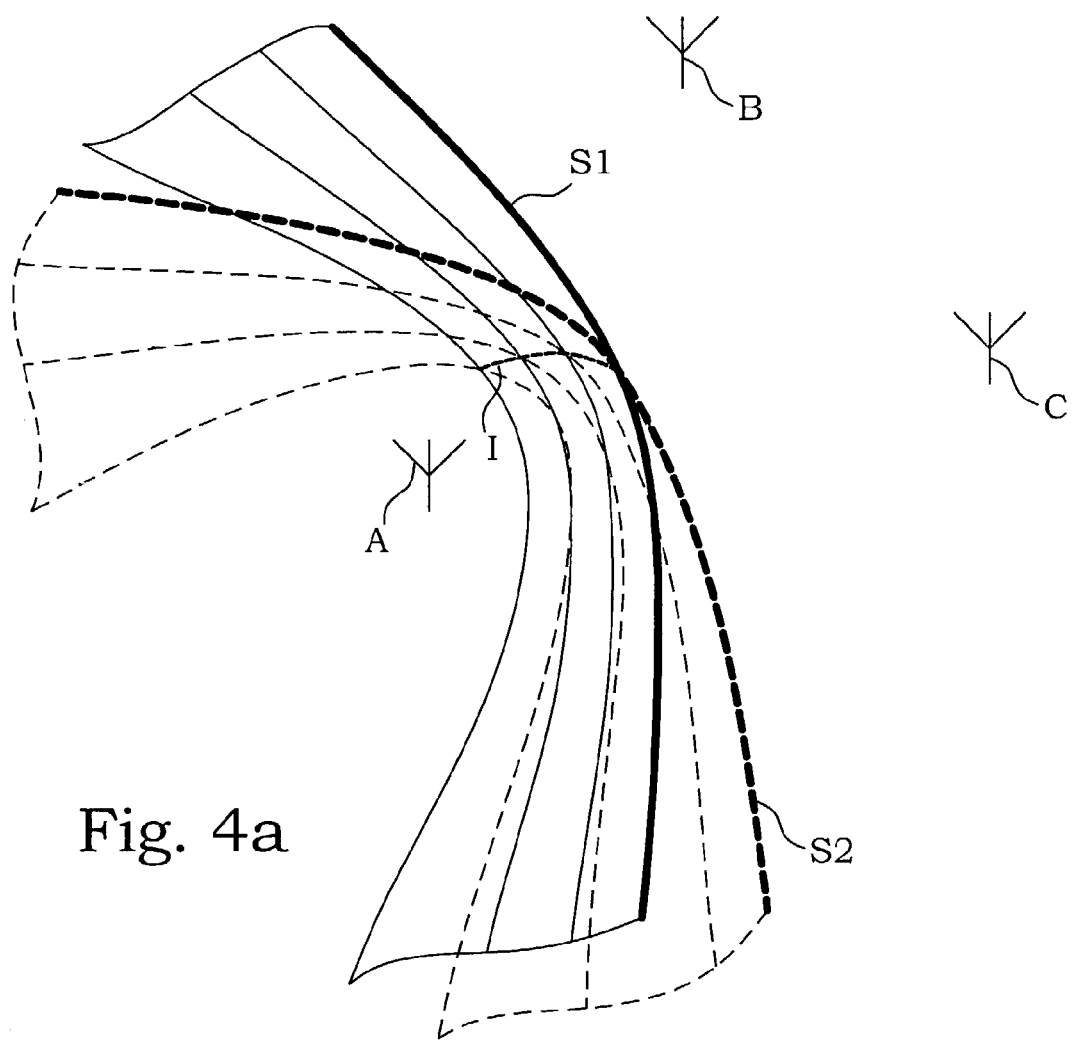
Fig. 4a
Fig. 4b
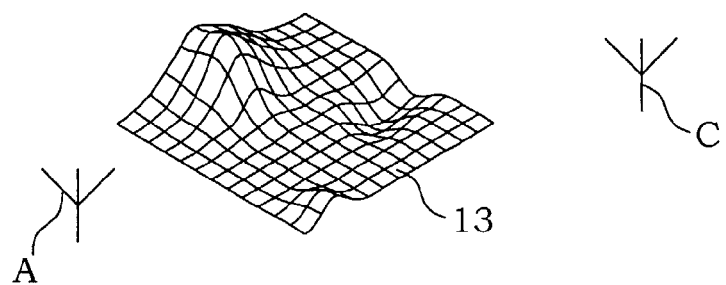

POSITION DETERMINATION IN WIRELESS COMMUNICATION SYSTEMS

TECHNICAL FIELD

The present invention relates in general to wireless communication systems and in particular to position determination of mobile units in such systems.

BACKGROUND

The terms positioning and navigation in a wireless communication system are connected to technology with the purpose of determining the geographic position of an object, equipment or a person carrying the equipment. The position is given with respect to a specified coordinate system. A common approach is to use positioning by means of measuring the arrival times of radio waves from a number of not co-located transmitters, to the positioned object. This is the basic principle of many positioning approaches, e.g. the so-called Observed Time Difference Of Arrival—Idle Period Down Link (OTDOA-IPDL) positioning method that has been standardised by 3GPP. However, the proposed technology is also applicable and useful for multi-carrier CDMA and other CDMA systems.

The positioning of a mobile unit can be performed for many purposes. The most obvious purpose is perhaps the desire to have a possibility to determine the position of a mobile unit signaling an emergency message. Other purposes could be more business directed, such as e.g. providing site specific advertising information over a mobile telephone. The need for positioning accuracy is already today well investigated. There are e.g. stringent coverage and accuracy requirements on emergency positioning methods in North America.

In particular, user equipment (UE) based methods (to which OTDOA-IPDL belongs) require a 50 m absolute accuracy for 67% of all UE's within the network. It is therefore clear for anyone skilled in the art that very small additional errors can be tolerated on top of the raw measurement accuracy (of the time of arrival measurement in the UE). This measurement accuracy, which in practice is of about 10% of a chip (10 m), is further amplified with geometric effects, e.g. so called VDOP (Vertical Dilution of Precision) and HDOP (Horizontal Dilution of Precision). These factors are typically of the order of 1.5–3, meaning that the raw measurement accuracy is already relatively close to the 50 m limit. Multipath and none-line of sight (LOS) propagation constitute other major error sources.

Very briefly, the OTDOA method relies on measurements on so called CPICH (Common PIlot CHannel) radio signals from multiple sites. The measurement is performed by means of correlation with the known CPICH signals of the sites (and cells) measured upon. Assuming for the moment that measurements of CPICH timing are successful for a number of sites, the following relations between detection times, transmission times and the distances between the UE and the sites follow:

$$t_1 + t_{clockbias} = T_1 + \|r_1 - r_{UE}\|/c$$
$$\vdots$$
$$t_n + t_{clockbias} = T_n + \|r_n - r_{UE}\|/c.$$

Here $t_i$, $i=1, \ldots, n$ denotes the measured time of arrivals in the UE, $T_i$, $i=1, \ldots, n$ denotes the transmission times from the node B's and c is the speed of light. The clock bias (error) originate from the fact that network and UE times may not be perfectly synchronized. The boldface quantities are the (vector) locations of the sites and the UE. In order to remove the clock bias, in the OTDOA method, time of arrival differences with respect to the own site can be formed according to:

$$OTD_{21} = t_2 - t_1 = T_2 - T_1 + \|r_2 - r_{UE}\|/c - \|r_1 - r_{UE}\|/c$$
$$\vdots$$
$$OTD_{n1} = t_n - t_1 = T_n - T_1 + \|r_n - r_{UE}\|/c - \|r_1 - r_{UE}\|/c.$$

In these n−1 equations, the left hand sides are basically known (with some additional measurement error). The time of transmission differences (denoted the real time differences, the RTD's) can be measured by one of two methods. In the method preferred by Ericsson, a GPS receiver in each RBS (Radio Base Station) measures the absolute GPS time with a high accuracy. This is used in order to time stamp the time of transmission from the RBS, and hence the real time differences (with some measurement errors) are known also. A second method uses a WCDMA receiver at a pre-determined location that measures the RTD's indirectly, by measuring OTD's and then calculating the RTD's. Furthermore, the locations of the sites, $r_i$, $i=1, \ldots, n$, can be surveyed to within a few meters and so they are accurately known as well. What remains unknown is the UE location. In case a two-dimensional positioning is requested, i.e. a lateral unknown position is sought, the UE location to be computed is:

$$r_{UE} = (x_{UE} \ y_{UE})^T.$$

It then follows that at least two time of arrival differences are needed in order to find a UE position. This, in turn, means that at least three sites need to be detected for UE positioning. However, in cases where only the absolute minimum number of sites are detected, there may be multiple (false) solutions. In such cases, at least one more site has to be added, i.e. totally four sites.

As indicated indirectly above, it would be beneficial if the position determination could be improved over the measurement accuracy. In theory, the accuracy of the positioning can be improved if more measurements are collected and a maximum likelihood solution is introduced. However, also this procedure involves more than the minimum number of sites.

In practice, the so-called near-far problem makes it troublesome for a UE in a CDMA system to detect neighbour cells in large portions of the own cell. This is because the users of CDMA systems all share the same frequency and hence the own cell transmission drowns the weaker signals from neighbour sites. By assuming a certain geometrical pattern of the wireless communication system sites, it is possible to calculate the percentage of the area of the own cell, in which a certain signal to interference ratio or Ec/IO for detecting neighbouring cells exist. Present requirements of 3GPP call for a UE measurement capability down to approximately −20 dB Ec/IO.

Under certain realistic conditions, see Ericsson, "IPDL simulation for time mask evaluation", R4-020118 TSG-RAN WG4, meeting #21, Sophia Antipolis, France, Jan. 28–Feb. 1, 2002, it can be shown that one neighbour site can be detected in 48% of the own cell, two neighbour sites in 19% of the own cell and three neighbour sites in 4% of the own cell. Thus lateral positioning is possible in 19% of the own cell (assuming no false solutions) and improved positioning with support from one extra cell is possible in only 4% of the own cell. This is obviously not acceptable and something has to be done to reduce the interference from the own cell.

One way to improve these conditions is to use the IPDL method. This approach solves the problem by turning off/ attenuating the power from the own cell during very short periods, typically one slot, which is equal to 667 microseconds or 2560 chips of the WCDMA signal. This reduces the interference significantly. When using IPDL, one neighbour site can be detected in 96% of the own cell, 2 neighbour sites can be heard in 75% of the own cell while 3 neighbour sites can be heard in 45% of the own cell. This is a significant improvement, but not totally satisfactory. Since some improvement of the positioning accuracy is required in many cases, such improved positioning can only be obtained in at most 45% of the own cell.

In mountain areas or in extreme urban areas, where the terrain has a significant vertical extension, a positioning determination based on lateral coordinates may often suffer from additional errors due to that the UE is movable not only laterally, but also vertically. Also additional horizontal positioning errors result in these cases.

SUMMARY

One of the problems with prior art systems and positioning methods is that the positioning accuracy is insufficient in many situations. For instance, additional errors, may result in significant problems with respect to e.g. the FCC E-911 50 m accuracy requirement in the USA. Another problem is the near-far hearability problem, which means that only information from a very limited number of neighbour cells can be used. Yet another problem with prior art solutions is that vertical motion is not handled appropriately.

An object of the present invention is therefore to provide methods and devices for improving positioning accuracy. A further object is to involve vertical positioning in a simple and accurate manner. Another object of the present invention is therefore to provide methods and devices for positioning that reduce the needed number of hearable neighbour nodes.

The above objects are achieved by methods, devices and systems according to the enclosed patent claims. In general words, the vertical dimension or altitude is introduced in the positioning determination, preferably a three-dimensional position determination is performed. The altitude is according to the present invention introduced as additional information in terms of pre-determined geographical altitude data. The position determining can take place either in the mobile unit or in any suitable node in the wireless communication system. A provisional position can also be provided, which is subsequently corrected by use of pre-determined altitude data. The position determination is based on arrival time measurements of signals between the mobile unit and base stations of the system. Both downlink and uplink signals are possible to use. Round trip time measurements can be used to further reduce the need for several hearable base stations.

The altitude information can be introduced as parameters in the equations of an optimisation criterion. Alternatively, the altitude information can be augmented to the optimisation criterion. Preferably, differences between pairs of arrival times are used in order to remove any clock bias of the mobile unit time reference, with respect to network time.

The present invention improves the accuracy of the position determination in wireless communication systems without increasing the minimum required hearable sites. The proposed techniques can reduce both the additional horizontal positioning errors, caused by erroneously neglecting altitude variations of the mobile unit, and of course the vertical positioning errors. The position accuracy is improved by the proposed techniques by addition of geographical altitude information, even though a sufficient number of measurements are available. The proposed techniques makes it possible to perform successful three dimensional positioning with detection of only two neighbour sites, i.e. a reduction of one site as compared to a basic OTDOA-IPDL method, possibly augmented with a round trip time measurement.

Since there are no requirements for 3D positioning in the 3GPP specifications, some mobile units may compute positions based on pure horizontal assumptions. The invention discloses means for detection and compensation of such situations, where said compensations are performed in the network nodes. In particular, the invention makes it possible to upgrade a 2D-position to a 3D one, at the same time as the accuracy of the 2D position is improved.

BRIEF DESCRIPTION OF THE DRAWINGS

The invention, together with further objects and advantages thereof, may best be understood by making reference to the following description taken together with the accompanying drawings, in which:

FIG. 1b is an altitude profile connected to FIG. 1a;

FIGS. 4a–c illustrate the use of altitude data according to the present invention;

FIG. 5b is a block diagram of a mobile unit suitable for use in the system is of FIG. 5a;

FIG. 6b is a block diagram of a RNC suitable for use in the system of FIG. 6a;

FIG. 7b is a block diagram of a mobile unit and RNC suitable for use in the system of FIG. 7a;

FIG. 7c illustrates the information flow in a system according to FIG. 7a;

FIG. 8b is a block diagram of a mobile unit suitable for use in the system of FIG. 8a;

FIG. 10b is a block diagram of a mobile unit suitable for use in the system of FIG. 10a;

DETAILED DESCRIPTION

According to the present invention, the altitude dimension is utilised in the positioning procedures.

Figure 1A:
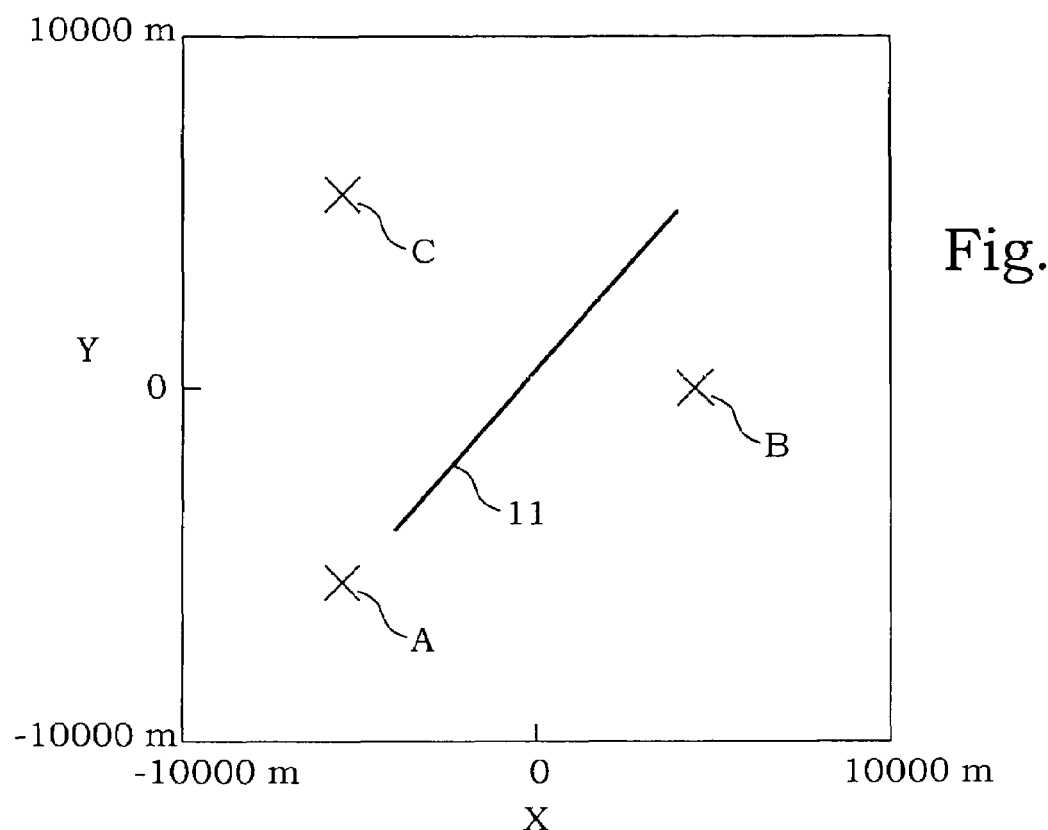
FIG. 1a is a schematic illustration of a model system used for evaluating effects of a neglected altitude.
Figure 1B:
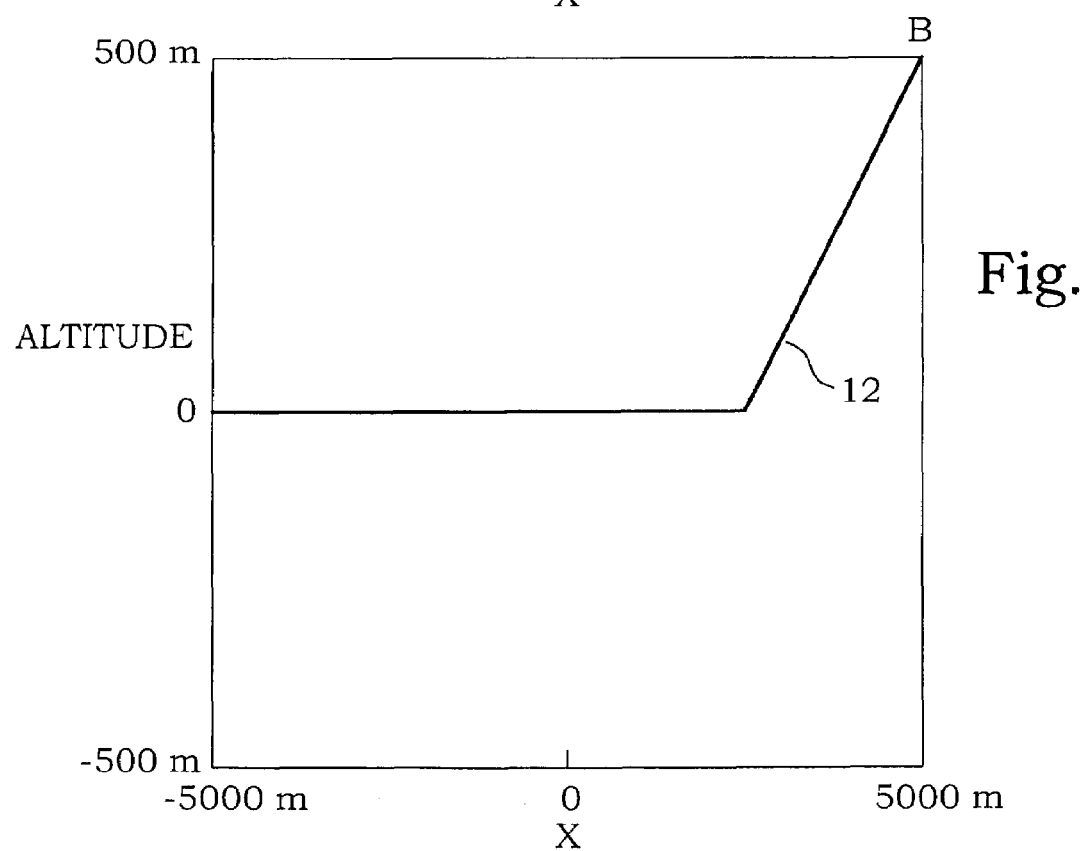

In order to address the effects of a neglected altitude, a scenario depicted in FIG. 1a is used. There, a total number of three sites A, B, C, base stations or node B's are detected by a mobile unit, including the own site. The three terms "site", "base station" and "node B" will in the present disclosure be used as equivalents. Similarly, we also consider the expressions "user equipment" and "mobile unit" to represent essentially identical items. The use of the different terms may be mixed throughout the present disclosure. It is first assumed that only horizontal positioning is performed. The mobile unit is allowed to move along a path 11, However, one of the sites B (x=5000 m, y=0 m) is located at higher altitude. The altitude profile of the geographic area is here assumed to be a function of the x-coordinate. Such an altitude profile 12 is illustrated in FIG. 1b, for the case where the altitude at B is 500 m. A number of different cases are considered, where the breakpoint is held constant in the evaluation, but the altitude at B is varied, using the values 100 m, 200 m, 300 m, 400 m, 500 m, 600 m and 700 m. The evaluation is performed assuming an OTDOA-IPDL calculation method.

In order to understand the results depicted in FIG. 2 below it is necessary to discuss the actual OTDOA-IPDL position calculation method. There are several possibilities, including maximum likelihood and least squares based methods available; however, the method used is based on the minimisation of a suitable criterion function.

In order to formulate such a criterion function, predicted time differences $OTD_{21}(x_{UE}, y_{UE})$, i=2,3, as seen by the mobile unit, are needed. These are given by:

$$OTD_{21}(x_{UE}, y_{UE}) = RTD_{21} + \frac{\sqrt{(x_2 - x_{UE})^2 + (y_2 - y_{UE})^2}}{c} - \frac{\sqrt{(x_1 - x_{UE})^2 + (y_1 - y_{UE})^2}}{c}$$

$$OTD_{31}(x_{UE}, y_{UE}) = RTD_{31} + \frac{\sqrt{(x_3 - x_{UE})^2 + (y_3 - y_{UE})^2}}{c} - \frac{\sqrt{(x_1 - x_{UE})^2 + (y_1 - y_{UE})^2}}{c}.$$

Here $(x_{UE}\ y_{UE})^T$ are the unknowns and the real time differences are given by:

$$RTD_{21} = T_2 - T_1$$

$$RTD_{31} = T_3 - T_1,$$

where $T_1$, $T_2$ and $T_3$ denote the times of transmission from the respective node B. Note that the clock bias disappears when time of arrival differences are formed. The unknowns can now be sought after by the minimisation of the following criterion:

$$V(x_{UE}, y_{UE}) = (OTD_{21}^{measured} - OTD_{21}(x_{UE}, y_{UE}))^2 + (OTD_{31}^{mesured} - OTD_{31}(x_{UE}, y_{UE}))^2,$$

where the superscript "measured" indicates that the quantity is the actual measurement. Hence, an estimate of the position of the mobile unit is obtained as:

$$\begin{pmatrix} \hat{x}_{UE} \\ \hat{y}_{UE} \end{pmatrix} = \underset{x_{UE}, y_{UE}}{\operatorname{argmin}} V(x_{UE}, y_{UE}).$$

Now, the measured data is in reality obtained from a three dimensional scenario, i.e. the altitude of the positioned mobile unit and the involved cell sites may be different from zero. However, the positioning calculation assumes a two-dimensional scenario since only $(x_{UE}\ y_{UE})^T$ is sought for. This inconsistency results in horizontal positioning errors, in addition to the lack of altitude information itself.

Figure 2:
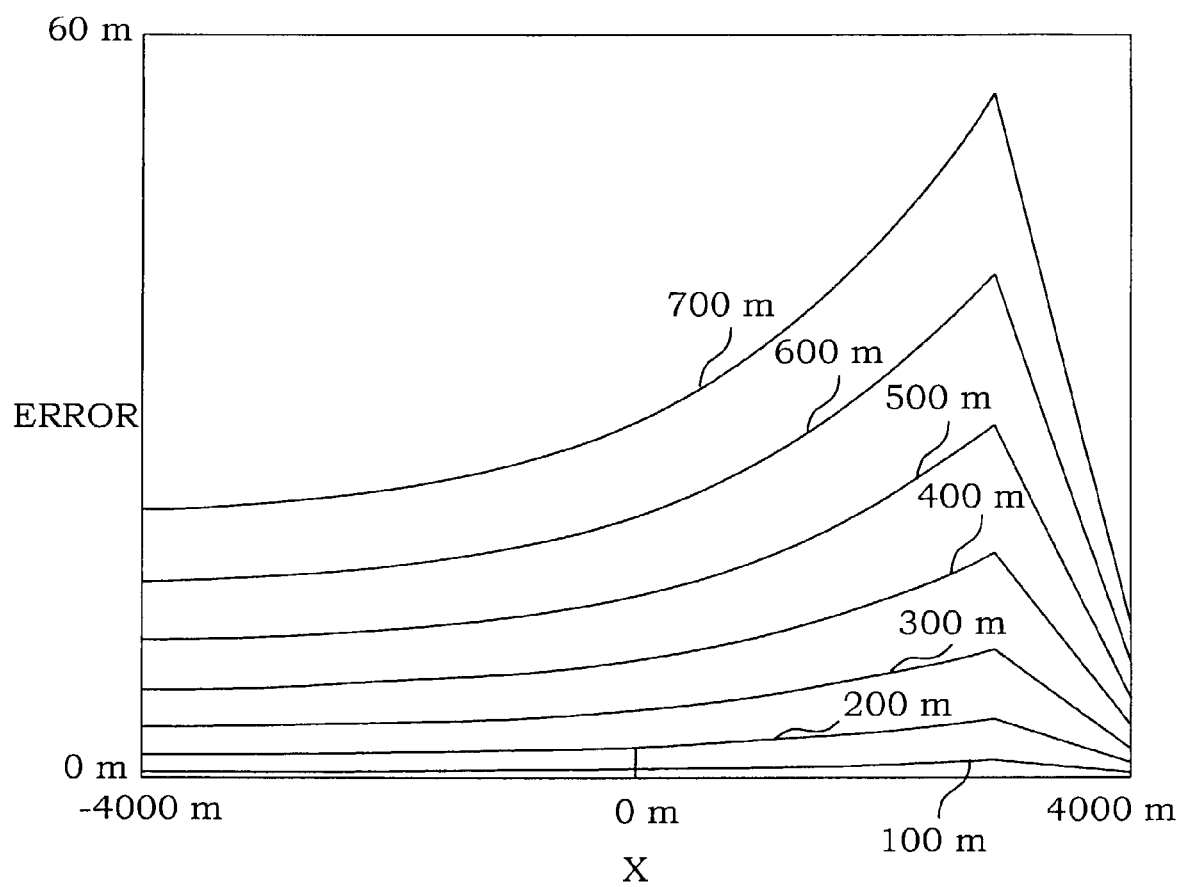
FIG. 2 is a diagram illustrating horizontal positioning errors of the system of FIGS. 1a and 1b.

These effects are assessed in FIG. 2, where the horizontal positioning error is plotted for site altitudes of the site in $(5000\ 0)^T$, i.e. site B, of 100 m–700 m. The mobile unit is assumed to follow the path 11 of FIG. 1a and the altitude profile 12 of FIG. 1b. Ideal measurements with zero measurement error are assumed in this case, in order to assess the pure effects of neglected altitude information. Quite naturally, the higher error curves correspond to the higher altitudes. It can be seen that for altitudes of e.g. 500 m, the mobile unit position error exceeds 20 m for substantial parts of the own cell. Note that this error is a bias error that should be added to the ordinary random measurement errors. This additional error source may then become significant, taking into account the absolute requirements that specify that 67% of the mobile units shall be positioned with an accuracy better than 50 m according to the FCC E-911 requirements in the USA.

Thus, horizontal positioning errors can occur both as a result of neglecting the altitude of the mobile unit and neglecting the altitudes of the sites of the measured cells.

Neglecting altitude information in the positioning calculation may lead to significant additional horizontal errors in mountainous areas, and in extreme urban areas with tall buildings. There are two sources of errors introduced by neglecting the altitude—namely the lack of the altitude itself and the additional induced horizontal positioning errors.

A few additional problems can now also be addressed. To describe these, assume first that the position calculation is constrained to the horizontal plane, and secondly that more than the minimum number of cells for a two-dimensional position calculation can be detected. In cases where the mobile unit or the sites are located at significantly different altitudes, the effect will be that the measurements do not fit together very well. Put differently, there will be a stretched out region where the mobile unit may be located also in cases of relatively small altitude effects. However, for more significant altitudes, there may even be multiple distinctive minimum points of the criterion used, leading to convergence to one of these points, in the calculation of the estimated position. In such a case, the estimated position is clearly likely to become erroneous.

To avoid the additional errors originating from the lack of altitude information, it is obviously necessary to include altitude information in one or another way. A most straightforward approach is to expand the positioning procedures of e.g. OTDOA into three dimensions. It then follows is that at least three time of arrival differences are needed in order to find a 3D mobile unit position. This, in turn, means that at least four sites need to be detected for 3D mobile unit positioning.

Furthermore, note that the accuracy of the altitude determination will not be very good in cases where the base stations and the mobile units are all located in or close to one and the same plane. This fact depends on pure geometric effects. In practice, accuracy can be improved if more measurements are collected and a maximum likelihood solution is introduced.

The OTDOA relations may be considered as hyperbolic functions in three coordinates. The solution of the positioning problem then corresponds to the common point or points of the hyperbolic function. In a general case, there might be more than one such solution. There may therefore be multiple solutions in cases where only the minimum number of sites is detected. Also here, including more measurements and performing e.g. a maximum likelihood solution can solve the problem.

It can therefore be seen that by including measurements from more sites, the positioning can be improved. The question that arises is then how many sites can in practice be detected by e.g. the OTDOA method. Is the number of available sites enough for providing the requested altitude information with high enough accuracy?

As mentioned above, the near-far problem makes it troublesome for a mobile unit to detect neighbour cells in large portions of the own cell. This is the case e.g. in the WCDMA system and similar systems. Essentially, this problem is caused by the fact that the transmissions from more distant cells are drowned by the transmissions from cells that are close. In a CDMA systems all base stations share the same frequency band. Therefore, the number of transmitters that can be used for positioning becomes severely limited. This is a problem, since positioning benefits from hearing as many sites as possible.

Figure 3A:
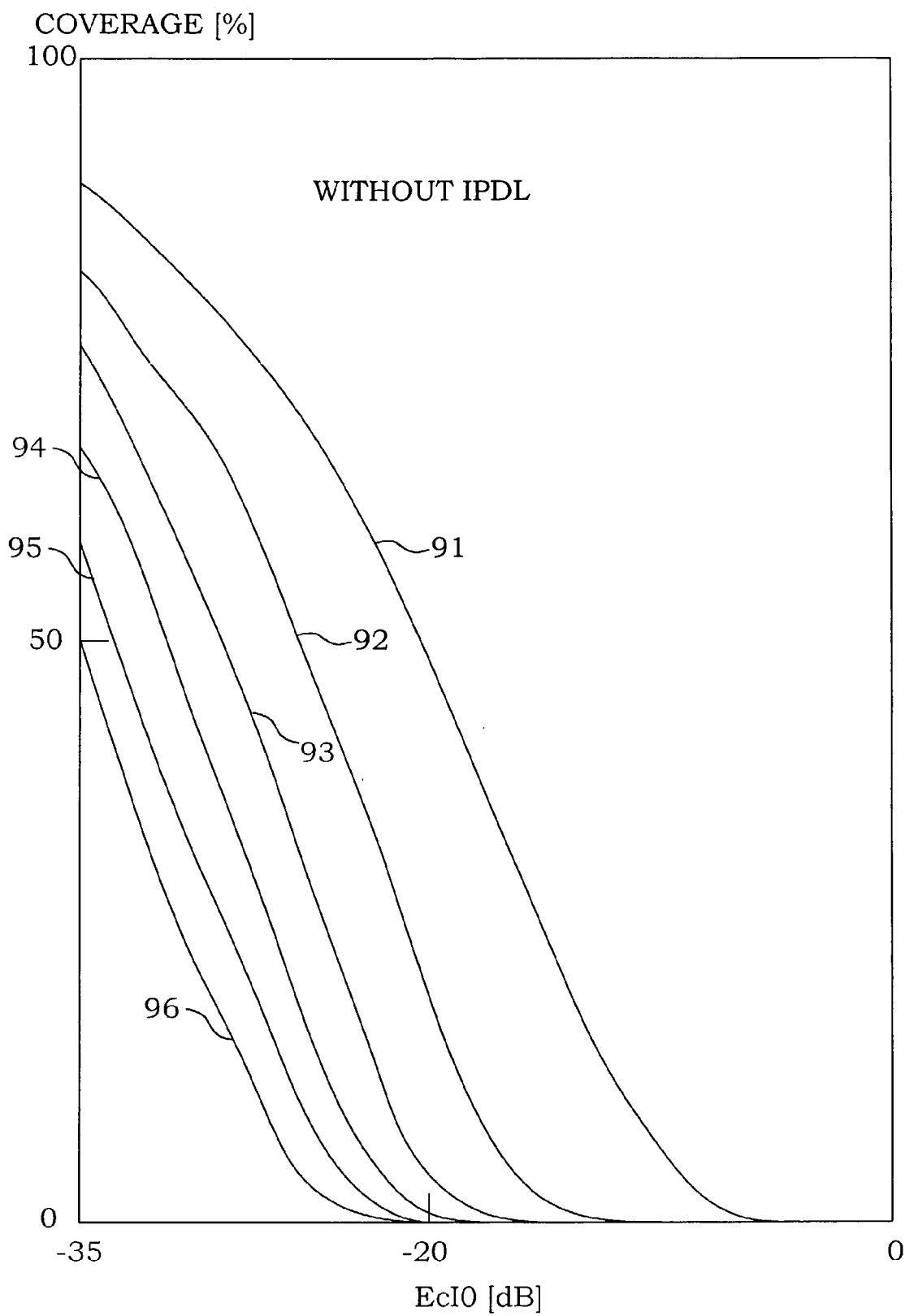
FIG. 3a is a diagram illustrating the near-far problem.

The near-far problem is illustrated in FIG. 3a. This plot shows the Ec/IO (one signal to interference ratio measure) required to detect neighbour sites on the horizontal axis and the corresponding coverage (percentage of the area of the own cell) on the vertical axes. Each curve 91–96 corresponds to detection of one neighbour site, the own site excluded, i.e. curve 91 corresponds to detection of the best neighbour site, curve 92 of the second best neighbour site etc. Note that, as discussed above, the present requirements of 3GPP calls for a mobile unit measurement capability down to approximately −20 dB Ec/IO. The curve is valid for high interference level and three sector antennas in an urban scenario.

One neighbour site can be detected in 48% of the own cell, two neighbour sites in 19% of the own cell and three neighbour sites in 4% of the own cell. Thus, 3D positioning is possible only in 4% of the own cell.

Figure 3B:
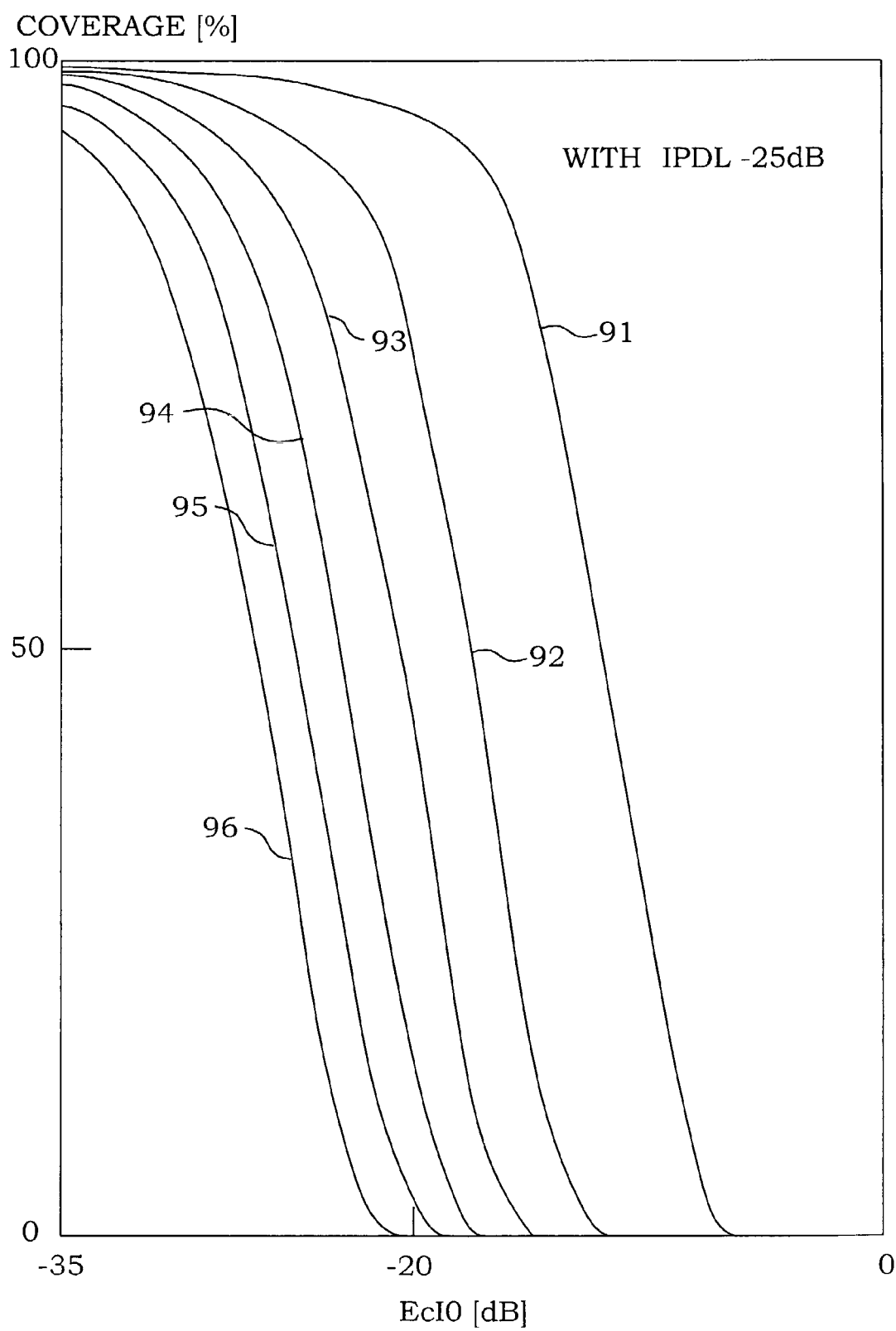
FIG. 3b is a diagram illustrating the near-far problem when IPDL is utilised.

By introducing the IPDL method interference is reduced significantly. The transmitter of the own cell is attenuated periodically for short periods of time. The effect of a 25 dB attenuation can be seen in FIG. 3b. For identical conditions as for FIG. 3a, at least one neighbour site can be detected in 96% of the own cell, at least 2 neighbour sites can be heard in 75% of the own cell while at least 3 neighbour sites can be heard in 45% of the own cell. Thus, despite the improvements, 3D positioning is still possible only in 45% of the own cell.

If further accuracy improvement or false solution rejection is needed, even more neighbour sites have to be used. Anyone skilled in the art realises that such an approach is difficult to use in practice.

According to the present invention, pre-determined altitude information is utilised Lo introduce the third dimension in the positioning of the mobile unit. The pre-determined altitude information comprises or can be transformed into altitude data as a function of a lateral position within a certain cell of the communication system. For each lateral position, there is a unique altitude value. In a typical situation, this altitude is a representation or estimation of the most probable altitude of the mobile unit at this lateral position. In other words, the main idea of the invention is to provide additional information in terms of pre-determined geographical altitude data to aid in the positioning computations. In a mathematical sense, the pre-determined altitude information presents one additional relation between lateral coordinates and the altitude. The problem of finding the three coordinates of the 3D position is thus reduced into finding two unknown variables. Different preferred embodiments of incorporating pre-determined altitude information are discussed further below. As a consequence, the number of required measurable sites is reduced by one unit.

Figure 4C:

The effect of the altitude data introduction is schematically illustrated by the FIGS. 4a–c. In FIG. 4a, two three-dimensional surfaces S1, S2, representing three-dimensional relations between the three coordinates determined from time measurements, e.g. differences in arrival time from different sites, are drawn. Using e.g. the OTDOA method, the two surfaces S1, S2 are deduced from measurements from three sites A, B, C, including the own base station. The intersection I of the two surfaces S1, S2 represents possible solutions of the positioning problem. In FIG. 4a it can easily be seen that the solution is under-determined, i.e. there are an infinite number of possible solutions along the intersection I between the surfaces S1, S2.

In FIG. 4b, altitude, information 13, useful in the present invention, is illustrated. For each lateral position, there is a corresponding altitude, which defines a surface in three dimensions. The general assumption is that geographical altitude information is available, that describes the altitude of the mobile unit as a function of the (unknown) horizontal position. That means that a surface 13 represented by a functional relationship (explicit or implicit) is available according to:

$$z_{UE}=GIS(x_{UE}, y_{UE}).$$

The altitudes of the cell sites A, B, C are assumed to be known with respect to some common coordinate system.

In FIG. 4c, the two pieces of information are combined. A unique solution is found at the point P where the intersection I of the surfaces S1, S2 (FIG. 4a) in turn intersects the altitude information surface 13. The introduction of the altitude information 13 thus reduces the need for further measurements.

The altitude information 13 can in principle in most cases easily be pre-determined. However, determination and distribution of altitude information 13 at cell level within e.g. a WCDMA system is nontrivial. The accuracy, the density of the geographical data within the cell, the required signaling bandwidth and other parameters must all be weighted against each other. Ways of determining and distribution of such altitude information are discussed more in detail further below.

In a general case, intersection between two surfaces S1, S2, as in FIGS. 4a–c and an altitude map 13 may have more than one solution. Such problems are also discussed further below.

The use of the altitude information in an OTDOA method can be described as follows. The basic OTDOA equations are given by (see above for details):

$$OTD_{21} = t_2 - t_1 = T_2 - T_1 + \|r_2 - r_{UE}\|/c - \|r_1 - r_{UE}\|/c$$

$$\vdots$$

$$OTD_{n1} = t_n - t_1 = T_n - T_1 + \|r_n - r_{UE}\|/c - \|r_1 - r_{UE}\|/c.$$

These differences remove any unknown time bias between the mobile unit and the base stations. The unknown 3D mobile unit position is:

$$r_{UE} = (x_{UE}\ y_{UE}\ z_{UE})^T.$$

Here, the measured observed arrival time differences (OTD's) as well as the real time differences (RTD's) are assumed to be known, exactly as above. Then, by insertion of the coordinates of the UE in the n−1 OTDOA equations, the results is:

$$OTD_{21}^{aug}(x_{UE}, y_{UE}, z_{UE}) = T_2 - T_1 + \frac{\sqrt{(x_2 - x_{UE})^2 + (y_2 - y_{UE})^2 + (z_2 - z_{UE})^2}}{c} - \frac{\sqrt{(x_1 - x_{UE})^2 + (y_1 - y_{UE})^2 + (z_1 - z_{UE})^2}}{c}$$

$$\vdots$$

$$OTD_{n1}^{aug}(x_{UE}, y_{UE}, z_{UE}) = T_n - T_1 + \frac{\sqrt{(x_n - x_{UE})^2 + (y_n - y_{UE})^2 + (z_n - z_{UE})^2}}{c} - \frac{\sqrt{(x_1 - x_{UE})^2 + (y_1 - y_{UE})^2 + (z_1 - z_{UE})^2}}{c}$$

Now, since the altitude relation $z_{UE} = GIS(x_{UE}, y_{UE})$ is available, it is possible to eliminate one of the coordinate components of the mobile unit position vector (preferably $z_{UE}$). This can preferably be handled in two ways.

The first method leaves the OTDOA equations unaltered and augments $z_{UE} = GIS(x_{UE}, y_{UE})$ to the other equations in a criterion minimisation step described by:

$$\begin{pmatrix} \hat{x}_{UE} \\ \hat{y}_{UE} \\ \hat{z}_{UE} \end{pmatrix} = \underset{x_{UE}, y_{UE}, z_{UE}}{\arg\min}\ V(x_{UE}, y_{UE}, z_{UE}),\ \text{subject to } z_{UE} = GIS(x_{UE}, y_{UE}),$$

where

-continued $$V(x_{UE}, y_{UE}, z_{UE}) = \sum_{i=2}^{n} (OTD_{i1}^{measured} - OTD_{i1}^{aug}(x_{UE}, y_{UE}, z_{UE}))^2.$$

Here, the criterion need not be a squared sum of n−1 OTDOA errors as above, more general formulations do apply as well. The key point is that conventional constrained minimisation methods using e.g. Lagrange multipliers can be directly applied to solve the problem.

The second method explicitly inserts $z_{UE} = GIS(x_{UE}, y_{UE})$ into the OTDOA equations, resulting in:

$$OTD_{21}^{ins}(x_{UE}, y_{UE}) = T_2 - T_1 + \frac{\sqrt{(x_2 - x_{UE})^2 + (y_2 - y_{UE})^2 + (z_2 - GIS(x_{UE}, y_{UE}))^2}}{c} - \frac{\sqrt{(x_1 - x_{UE})^2 + (y_1 - y_{UE})^2 + (z_1 GIS(x_{UE}, y_{UE}))^2}}{c}$$

$$\vdots$$

$$OTD_{n1}^{ins}(x_{UE}, y_{UE}) = T_n - T_1 + \frac{\sqrt{(x_n - x_{UE})^2 + (y_n - y_{UE})^2 + (z_n - GIS(x_{UE}, y_{UE}))^2}}{c} - \frac{\sqrt{(x_1 - x_{UE})^2 + (y_1 - y_{UE})^2 + (z_1 - GIS(x_{UE}, y_{UE}))^2}}{c},$$

which are then solved for as:

$$\begin{pmatrix} \hat{x}_{UE} \\ \hat{y}_{UE} \end{pmatrix} = \underset{x_{UE}, y_{UE}}{\arg\min}\ V(x_{UE}, y_{UE}),$$

where $$V(x_{UE}, y_{UE}) = \sum_{i=2}^{n} (OTD_{i1}^{measured} - OTD_{i1}^{ins}(x_{UE}, y_{UE}))^2$$

Note that the formulation herein allows for a use of any minimisation algorithm. Examples include, gradient methods and Newton methods. See any standard book on optimisation theory for details.

So far, the description has assumed a removal step, where the clock-bias is removed by forming differences of arrival times. It is, however, also possible to use other approaches as well. One alternative approach is e.g. to keep the clock-bias as an additional unknown and where the criterion is modified accordingly to (3D positioning):

$$\begin{pmatrix} \hat{x}_{UE} \\ \hat{y}_{UE} \\ \hat{z}_{UE} \\ \widehat{clockbias}_{UE} \end{pmatrix} = \underset{x_{UE}, y_{UE}, z_{UE}, clockbias_{UE}}{\arg\min} V(x_{UE}, y_{UE}, z_{UE}, clockbias_{UE}),$$

subject to $$z_{UE} = GIS(x_{UE}, y_{UE}),$$

where $$V(x_{UE}, y_{UE}, z_{UE}, clockbias_{UE}) =$$

$$\sum_{i=1}^{n} \left( t_i^{measured} - T_i + t_{clockbias} - \frac{\sqrt{(x_i - x_{UE})^2 + (y_i - y_{UE})^2 + (z_i - z_{UE})^2}}{c} \right)^2.$$

Also modifications and/or combinations of these approaches are possible to use.

The present invention can be used in a number of different configurations, which are useful in different types of systems and contexts. A number of exemplifying embodiments will therefore be illustrated here below.

Figure 5A:
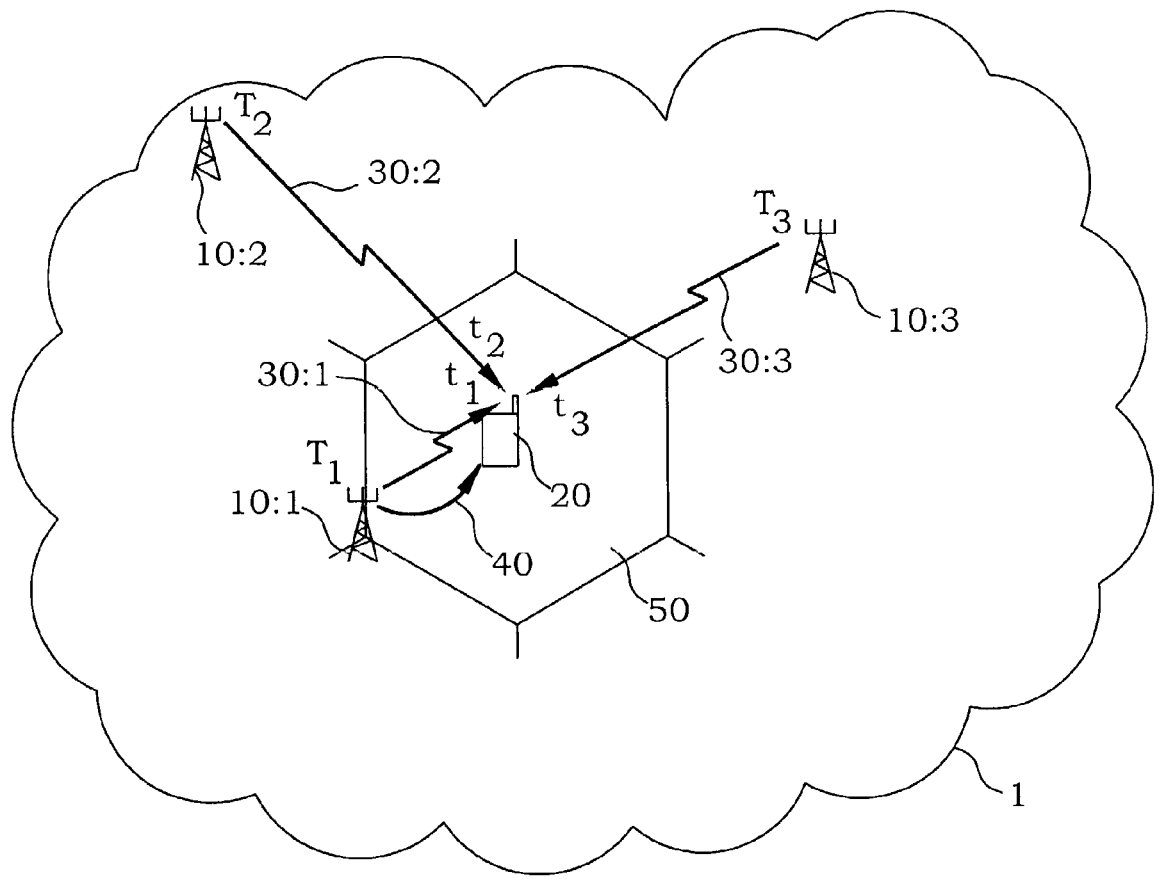
FIG. 5a illustrates an embodiment of a wireless communication system according to the present invention, performing positioning calculations in the mobile unit from downlink signals.

FIG. 5a illustrates an embodiment of a wireless communication system 1, having three base stations 10:1, 10:2, 10:3 within hearability distance from a mobile unit 20. The mobile unit 20 is present in a cell 50 associated with base station 10-1. At time $T_1$ base station 10:1 sends a signal, which is observed by the mobile unit 20 at time $t_1$. Similarly, at times $T_2$ and $T_3$, signals are sent from base stations 10:2 and 10:3, and recorded by the mobile unit 20 at times $t_2$ and $t_3$, respectively. $T_1$ to $T_3$ are transmission times associated with the signals. These transmission times are determined by the communication system and represent a transmission time from respective transmitting node relative to a system time reference. The mobile unit 20 can obtain information about such transmission times by the data content of the transmitted signal itself or over other channels. The base station 10:1 also provides the mobile unit 20 with pre-determined altitude information.

Figure 5B:
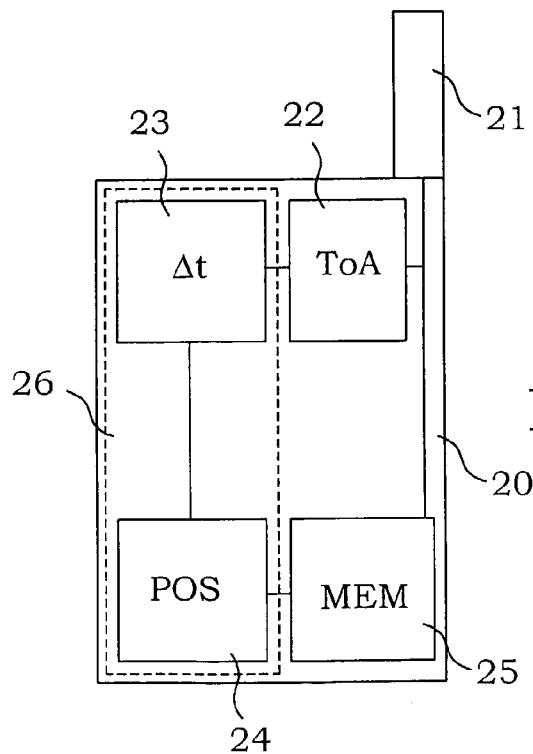

In FIG. 5b, a block diagram of an embodiment of a mobile unit 20 used in FIG. 5a is illustrated. The mobile unit 20 comprises a receiver 21 connected to a time-of-arrival detector 22. The differences between the detected times of arrival are obtained in a difference unit 23. The differences are used as inputs of a position calculation section 24, in which the position of the mobile unit is determined. The pre-determined altitude information used in the position calculation is retrieved from a memory 25. Preferably, the difference unit 23 and the position calculation section 24 are comprised in a processor 26.

In the present embodiment the processor 26 comprises the difference unit 23 and the position section 24. However, in other embodiments, the processor may comprise another set of the different means, e.g. including the time-of arrival detector 22. The means may also be implemented in different processors or in a distributed manner. The exact structure of these embodiments should not restrict the structures protected by the enclosed claims, but should only be regarded as examples.

In this embodiment, arrival times of three downlink signals are used for the positioning. Differences are used to remove any clock bias between the mobile unit and the base stations. Two time differences are used together with the altitude information to obtain the three-dimensional position. Optionally, the determined position of the mobile unit 20 can eventually be transferred back to the base station 10:1, so that the communication system can make use of the position information. The entire position determination is performed within the mobile unit 20 itself. It is thus necessary that suitable altitude information is available in the mobile unit 20. Since the mobile unit 20 can travel between different cells in the system, the actual altitude information has to be changed accordingly. The altitude information is preferably provided to the mobile unit from its base station, e.g. when registering in its cell, or it can also be stored in the mobile unit. However, transmission of an entire altitude map involves huge amount of data, which may occupy considerable communication resources.

In a preferred embodiment, the data of a digital altitude map of a cell is compressed in a node, e.g. a radio network controller (RNC), by defining a polygon representing the boundary of the cell. A point having two coordinates in a horizontal plane, e.g. latitude and longitude, and an associated altitude parameter defines each polygon corner. In this manner a set of at least three points is defined. This set of points is a relatively limited amount of data, which easily can be transferred to a mobile unit by signals over an interface. In the mobile unit, the set of points is used as parameters for creating an altitude model. By using a pair of lateral coordinates as input arguments of the model, an estimation of an associated altitude can be derived.

In a simple case, the altitude parameter of the points transferred between the base station and the mobile unit is the true altitude of the corresponding position according to an altitude map. However, more elaborate algorithms comprise optimisation of the altitude parameter with respect to points of the interior of the cell, and preferably also with respect to points in neighbouring cells as well. Since such calculations may be performed once-and-for-all e.g. in the RNC, the optimisation algorithms may be quite advanced. Piecewise linear models, polynomial models in two variables and spline models are examples of different useful embodiments of models and can be used together with a variety of different optimisation methods and optimisation criteria.

In the mobile unit, where the altitude estimation is performed, different altitude models can be used, e.g. piecewise linear models, polynomial models in two variables or spline models. The result is preferably stored in the memory 25. The choice of model can be adapted to the processing performance of the mobile unit. Preferably, the mobile unit uses the same altitude model as is used in the RNC to provide the optimised set of points.

In a preferred embodiment, the format of the signals over the data transfer interface is a generalisation of the 3GPP GAD formats, where lateral coordinates are compatible with the 3GPP GAD polygon format and the altitude parameter is compatible with the 3GPP GAD ellipsoid point with altitude format.

Figure 6A:
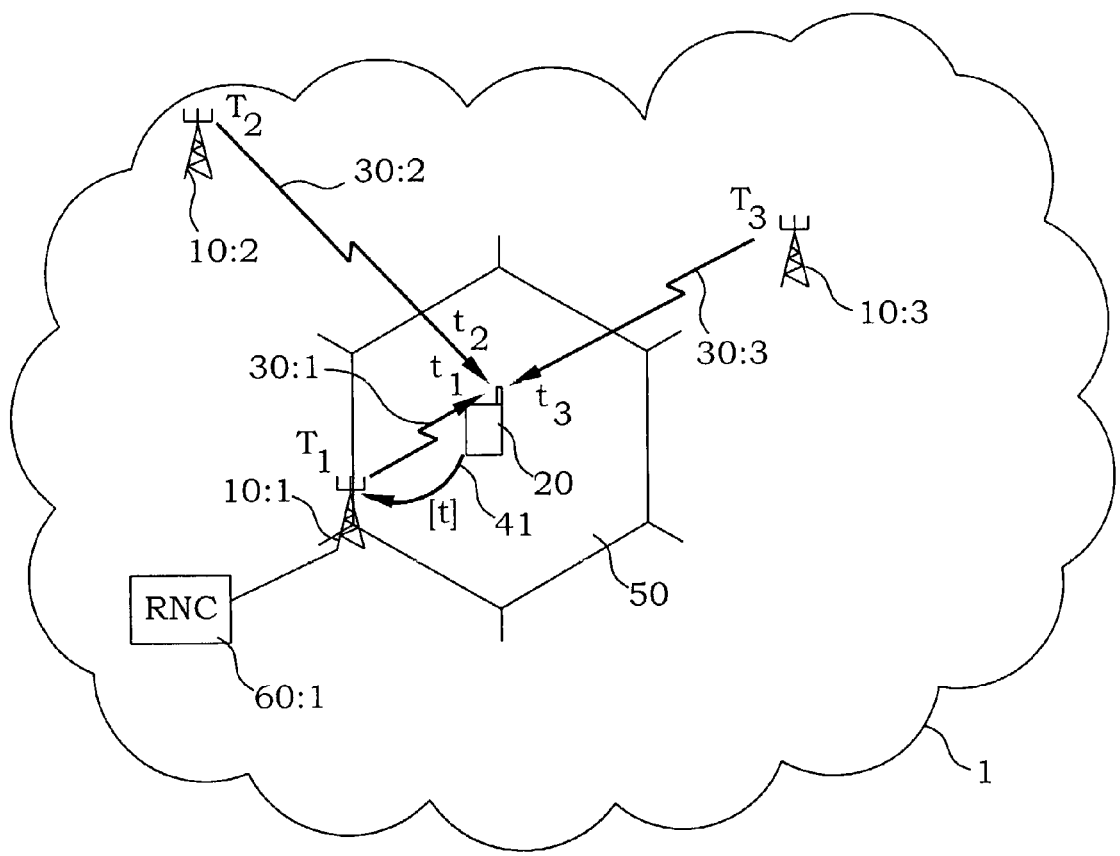
FIG. 6a illustrates an embodiment of a wireless communication system according to the present invention, performing positioning calculations in a system node from downlink signals.

FIG. 6a illustrates another embodiment of a wireless communication system 1, having three base stations 10:1, 10:2, 10:3 within hearability distance from a mobile unit 20. As in the previous embodiment, signals are transferred downlink and detected by the mobile unit 20. However, in this embodiment, the mobile unit 20 does only perform the arrival time measurements. Instead of further processing the measured arrival times, the set of arrival times 41 are sent back to the base station 10:1 of the mobile unit 20. The position determination is then performed in the base station 10:1 or in another network node connected thereto, e.g. a RNC 60:1. The position determination can be performed in any network node having access to the necessary information and having a sufficient processor capacity. Preferred nodes are node B's, base stations or most preferably RNC's.

An alternative to the embodiment of FIG. 6a, the mobile unit 20 may indeed process the arrival time measurements in that sense that differences are calculated. The differences are then sent back to the base station 10:1 for further processing, reducing the amount of data sent. However, data representing the time of arrival in different manners is sent back.

Figure 6B:
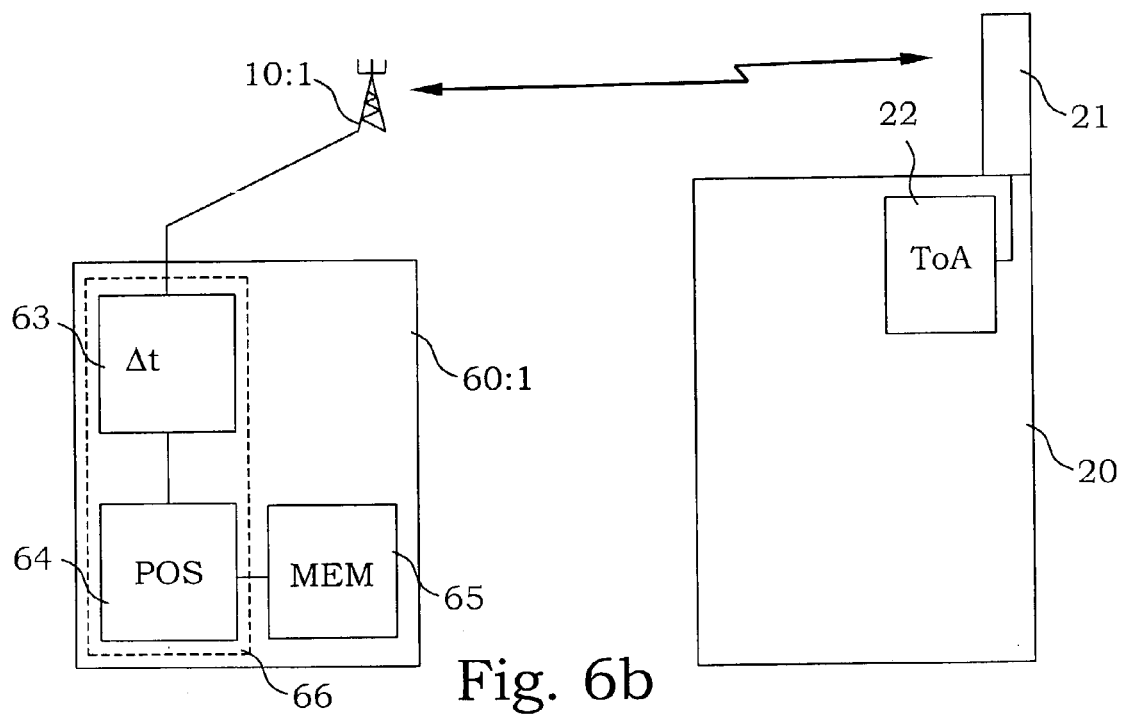

FIG. 6b illustrates schematically selected parts of the mobile unit 20, and the RNC 60:1 connected to the own base station 10:1 of the mobile unit 20. The mobile unit 20 still comprises means for observing points of arrival times of downlink signals from the three base stations 10:1, 10:2 and 10:3. The arrival times are communicated back to the base station 10:1 and forwarded to the RNC 60:1. The RNC comprises a difference unit 63, in which the differences between the detected times of arrival are obtained. The differences are used as inputs of a position calculation section 64, in which the position of the mobile unit 20 is determined. The pre-determined altitude information used in the position calculation is retrieved from a memory 65. Preferably, the difference unit 63 and the position calculation section 64 are comprised in a processor 66.

In the present embodiment the processor 66 comprises the difference unit 63 and the position calculation section 64. However, in other embodiments, the processor may comprise another set of the different means, e.g. excluding the difference unit 63. The means may also be implemented in different processors or in a distributed manner. The exact structure of these embodiments should not restrict the structures protected by the enclosed claims, but should only be regarded as examples.

In this embodiment, arrival times of three downlink signals are used for the positioning. Differences are used to remove any clock bias between the mobile unit and the base stations. Two time differences are used together with the altitude information to obtain the three-dimensional position. The actual position determination is performed within the RNC 60:1. It is thus necessary that suitable altitude information is available in or to the RNC 60:1. The determined position of the mobile unit 20 can eventually be transferred back to the mobile unit 20.

An alternative of the embodiment of FIGS. 6a–b is to perform the position calculations in a distributed manner. Parts of the calculations could e.g. be performed in the individual mobile unit, as mentioned above, or in the base stations, and part results e.g. the arrival time differences could be communicated to a node, where a final optimisation using pre-determined altitude information can be performed.

The reporting format used by the mobile unit can be used for determination of if the mobile unit has been able to make use of altitude in the positioning process. If so, the mobile unit can be expected to report the altitude back to the network. Assuming for the moment that no altitude information is reported, and that the reason for this is that the mobile unit for some reason has not been able to make use of such information. It is however, possible to correct for such altitude information afterwards.

Towards this end, note that the mobile unit position, in terms of 2D positioning, typically has been calculated using the equations:

$$OTD_{21}(x_{UE}, y_{UE}) = T_2 - T_1 + \frac{\sqrt{(x_2 - x_{UE})^2 + (y_2 - y_{UE})^2}}{c} - \frac{\sqrt{(x_1 - x_{UE})^2 + (y_1 - y_{UE})^2}}{c}$$

$$\vdots$$

$$OTD_{n1}(x_{UE}, y_{UE}) = T_n - T_1 + \frac{\sqrt{(x_n - x_{UE})^2 + (y_n - y_{UE})^2}}{c} - \frac{\sqrt{(x_1 - x_{UE})^2 + (y_1 - y_{UE})^2}}{c}$$

$$V(x_{UE}, y_{UE}) = \sum_{i=2}^{n} (OTD_{i1}^{measured} - OTD_{i1}(x_{UE}, y_{UE}))^2$$

$$\begin{pmatrix} \hat{x}_{UE} \\ \hat{y}_{UE} \end{pmatrix} = \arg\min_{x_{UE}, y_{UE}} V(x_{UE}, y_{UE}).$$

This means that the $(x_{UE}\ y_{UE})^T$ is not the absolutely correct position, rather the coordinates are the parameters that minimise the criterion. Note that the sites that the mobile unit has obtained OTD measurement upon need to be known in this method.

Now given the relation $z_{UE}=GIS(x_{UE}, y_{UE})$, it is straightforward to add the missing altitude information. However, the induced horizontal position error remains, and the next question is what can be done about this effect?

If it is assumed that the number of OTD's is what causes the lack of altitude information in the mobile unit response, it is clear that the minimisation should not suffer from local minima due to mismatch of OTD's. In fact, here the number of unknowns $(x_{UE}\ y_{UE})^T$ equals the number of measured OTDOA's. In a typical case, n=3. In such cases the minimisation can be expected to work well and the OTD's that were originally measured in the mobile unit should be accurately described by the OTDOA equations:

$$OTD_{21}(x_{UE}, y_{UE}) = T_2 - T_1 + \frac{\sqrt{(x_2 - x_{UE})^2 + (y_2 - y_{UE})^2}}{c} - \frac{\sqrt{(x_1 - x_{UE})^2 + (y_1 - y_{UE})^2}}{c}$$

$$OTD_{31}(x_{UE}, y_{UE}) = T_3 - T_1 + \frac{\sqrt{(x_3 - x_{UE})^2 + (y_3 - y_{UE})^2}}{c} - \frac{\sqrt{(x_1 - x_{UE})^2 + (y_1 - y_{UE})^2}}{c}$$

Figure 7C:
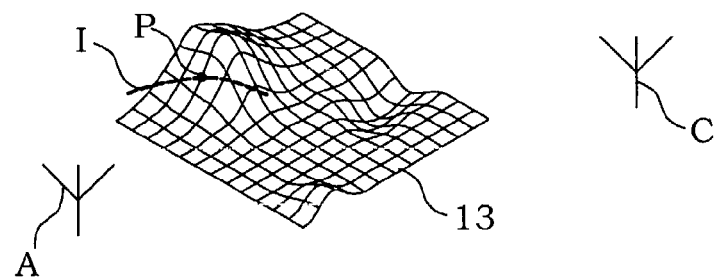
Figure 7C:
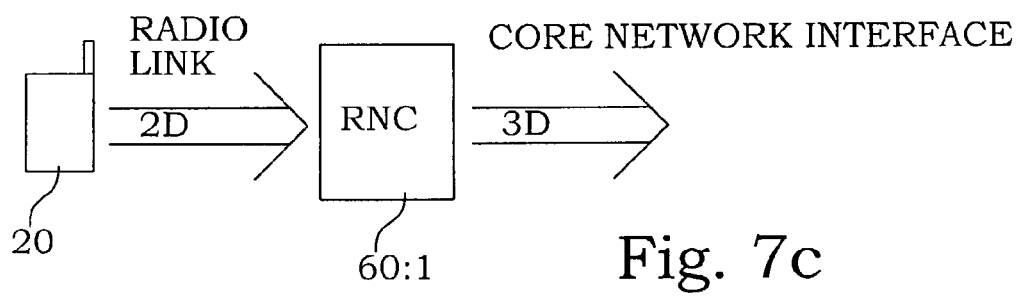
Figure 7A:
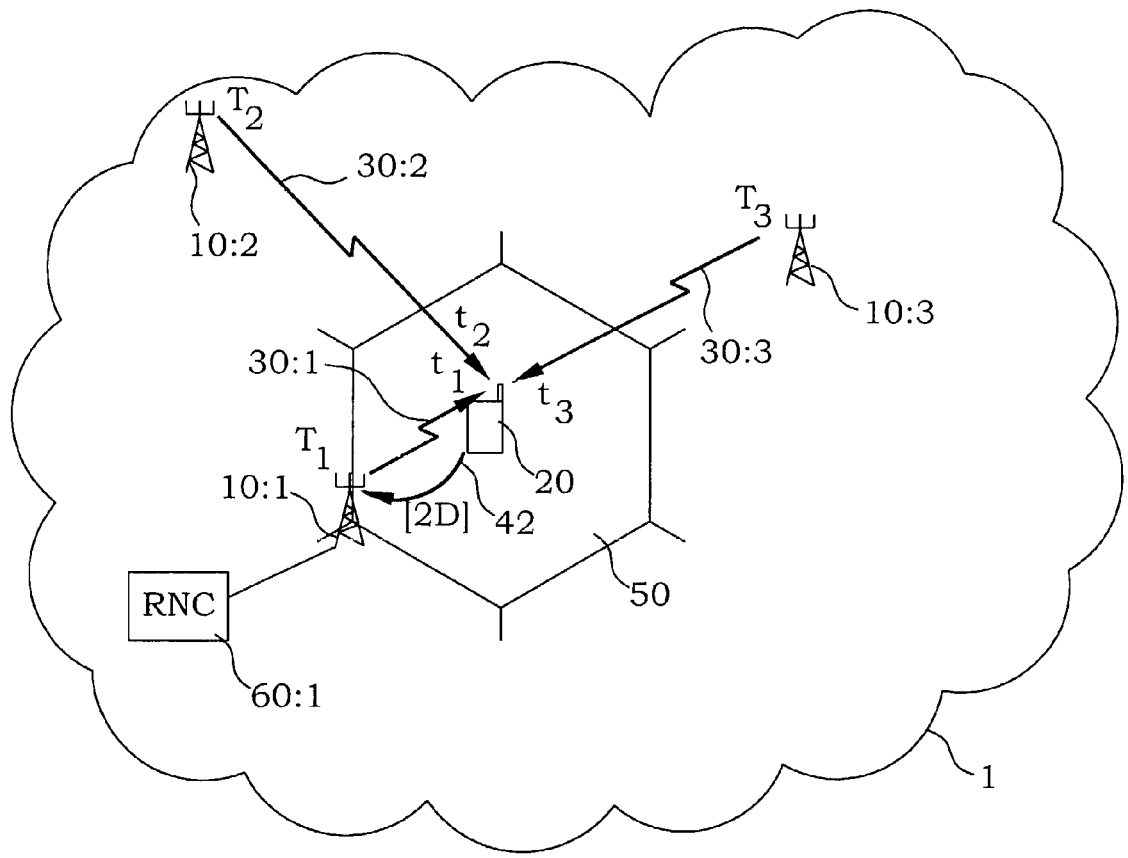
FIG. 7a illustrates an embodiment of a wireless communication system according to the present invention, performing provisional positioning calculations in the mobile unit from downlink signals and corrections in a system node.

FIG. 7a illustrates yet another embodiment of a wireless communication system 1, having three base stations 10:1, 10:2, 10:3 within hearability distance from a mobile unit 20.

As in the previous embodiments, signals are transferred downlink and detected by the mobile unit 20. However, in this embodiment, the mobile unit 20 does perform a conventional 2D position determination using the arrival time measurements. Instead of further using altitude information for obtaining any 3D position, the determined 2D position 42 is sent back to the base station 10:1 of the mobile unit 20. A correction of this preliminary 2D position is then performed in the base station 10:1 or in another network node connected thereto, e.g. the RNC 60:1.

Figure 7B:
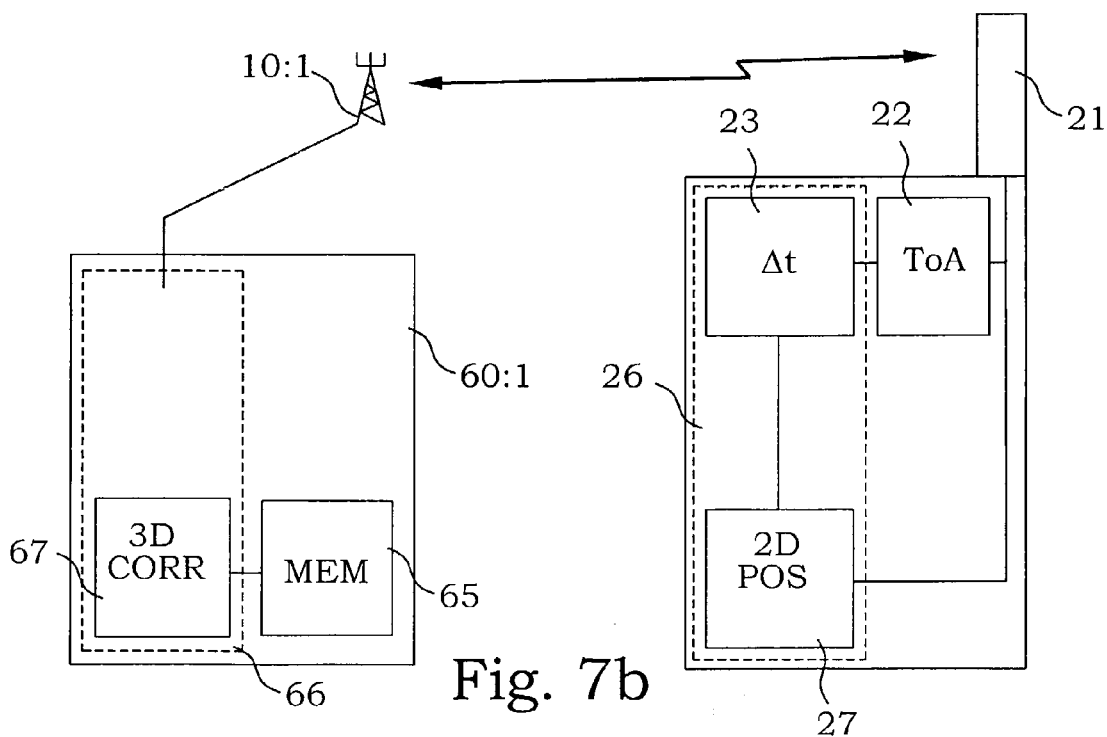

FIG. 7b illustrates schematically selected parts of the mobile unit 20, and the RNC 60:1 connected to the own base station 10:1 of the mobile unit 20. The mobile unit 20 still comprises means for observing points of arrival times of downlink signals from the three base stations 10:1, 10:2 and 10:3. The differences between the detected times of arrival are obtained in the difference unit 23. The differences are used as inputs of a 2D position calculation section 27, in which a provisional two-dimensional or lateral position of the mobile unit 20 is determined.

The provisional two-dimensional position is communicated back to the base station 10:1 and forwarded to the RNC 60:1. The RNC comprises a 3D correction unit 67, in which the 2D position is corrected into a 3D position using the pre-determined altitude information of memory 65. The computations are performed utilising the computed OTD's with the equations:

$$OTD_{21}^{comp}(x_{UE}^{2D}, y_{UE}^{2D}) = T_2 - T_1 + \frac{\sqrt{(x_2 - x_{UE}^{2D})^2 + (y_2 - y_{UE}^{2D})^2}}{c} - \frac{\sqrt{(x_1 - x_{UE}^{2D})^2 + (y_1 - y_{UE}^{2D})^2}}{c}$$

$$OTD_{31}^{comp}(x_{UE}^{2D}, y_{UE}^{2D}) = T_3 - T_1 + \frac{\sqrt{(x_3 - x_{UE}^{2D})^2 + (y_3 - y_{UE}^{2D})^2}}{c} - \frac{\sqrt{(x_1 - x_{UE}^{2D})^2 + (y_1 - y_{UE}^{2D})^2}}{c}$$

The RNC uses these OTD's, recovered by utilising the provisional 2D position $$(x_{UE}^{2D}, y_{UE}^{2D})^T$$

and knowledge about which base stations that were used, in a 3D mobile unit positioning calculation according to the methods outlined further above. This results in a refined horizontal mobile unit position and a refined altitude, e.g. according to:

$$\begin{pmatrix} \hat{x}_{UE}^{3D} \\ \hat{y}_{UE}^{3D} \\ \hat{z}_{UE}^{3D} \end{pmatrix} = \arg\min_{x_{UE}, y_{UE}, z_{UE}} V(x_{UE}^{3D}, y_{UE}^{3D}, z_{UE}^{3D}), \text{ subject to } z_{UE}^{3D} = GIS(x_{UE}, y_{UE}),$$

where $$V(x_{UE}^{3D}, y_{UE}^{3D}, z_{UE}^{3D}) = \sum_{i=2}^{3} (OTD_{i1}^{comp} - OTD_{i1}^{aug}(x_{UE}^{3D}, y_{UE}^{3D}, z_{UE}^{3D}))^2.$$

Alternatively, insertion directly into the OTDOA equations in analogy with previously described principles may be applied:

$$\begin{pmatrix} \hat{x}_{UE}^{3D} \\ \hat{y}_{UE}^{3D} \end{pmatrix} = \arg\min_{x_{UE}^{3D}, y_{UE}^{3D}} V(x_{UE}^{3D}, y_{UE}^{3D}),$$

where $$V(x_{UE}^{3D}, y_{UE}^{3D}) = \sum_{i=2}^{3} (OTD_{i1}^{comp} - OTD_{i1}^{ins}(x_{UE}^{3D}, y_{UE}^{3D}))^2.$$

When performing the 3D correction, the RNC thus needs information about which base stations the mobile unit detected. The 3D correction unit 67 preferably comprises means for collecting information about which base stations that were used. One alternative for obtaining this information is that the mobile unit 20 sends such information together with the provisional 2D position data. An alternative way is to first identify base stations that may be within hearable distances from the mobile unit 20. Coverage information stored in the network nodes may be required in order to obtain a successful implementation. Then an algorithm selects the set of base stations that fits best to the determined 2D position.

It has been shown by simulations that such an altitude compensation procedure significantly improves the distance errors in mobile unit positioning. FIG. 7c illustrates schematically the information flow for a network compensation of 2D mobile unit positioning.

Figure 8A:
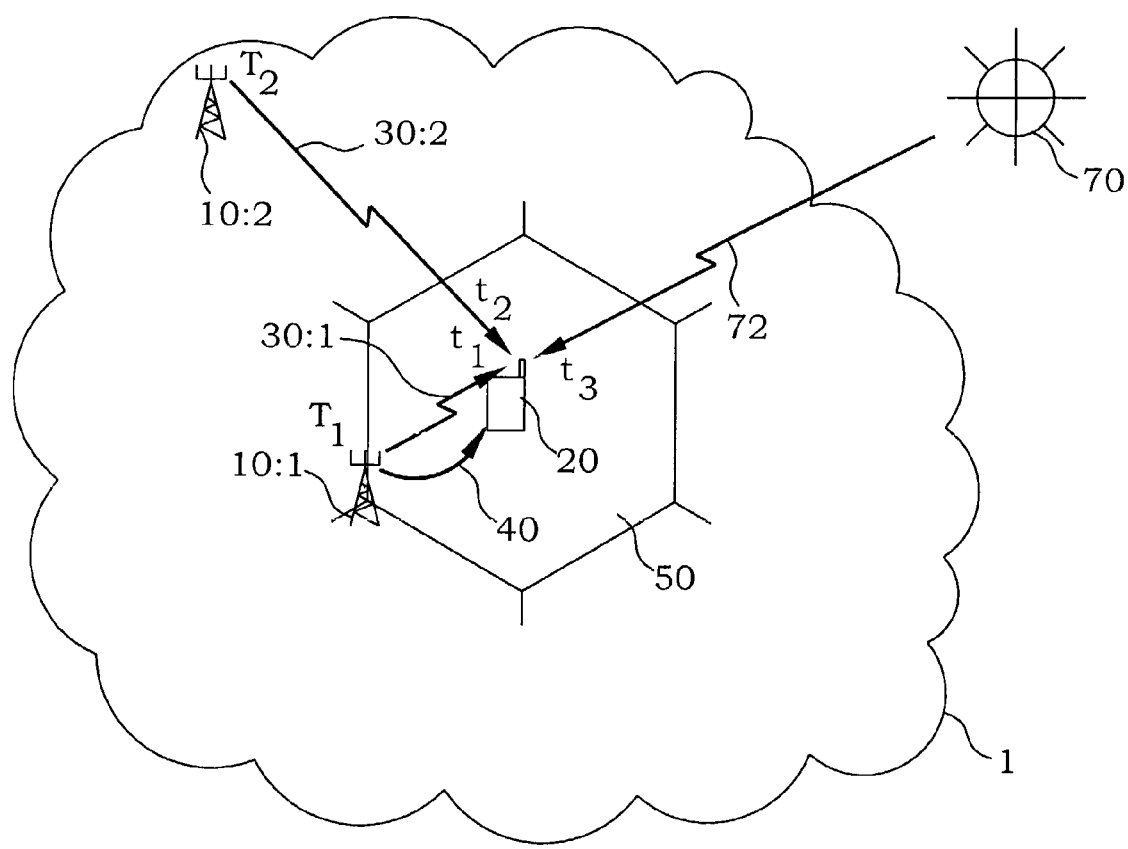
FIG. 8a illustrates an embodiment of a wireless communication system according to the present invention, using absolute synchronisation of the mobile unit time reference.

FIG. 8a illustrates an embodiment of a wireless communication system 1, having only two base stations 10:1, 10:2 within hearability distance from the mobile unit 20. As in previous embodiments, arrival times of downlink signals are determined in the mobile unit 20. In the present embodiment, the mobile unit 20 is provided with synchronisation means based on time information provided by an external unit. By communicating with an external unit 70, an absolute time reference relative to the wireless communication system 1 can be determined.

Figure 8B:
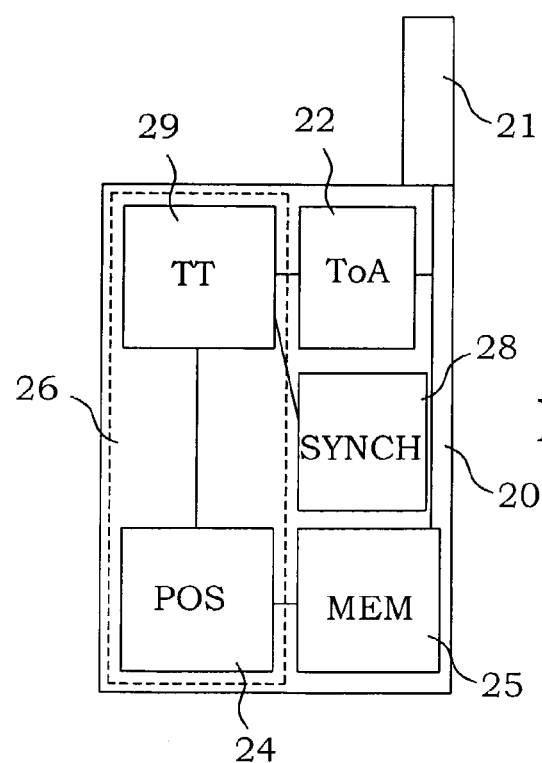

In FIG. 8b, a block diagram of an embodiment of a mobile unit 20 used in FIG. 8a is illustrated. The mobile unit 20 comprises a receiver 21 connected to a time-of-arrival detector 22. A travelling time determination means 29 calibrates the time-of arrivals to a system time reference provided by a GPS synchronisation unit 28. The absolute travelling time of the downlink signals can thus be determined. Such travelling times defines spheres around each base station instead of hyperbolic surfaces in the case of using lime differences. The equations for determining the position are thus modified, but the same calculation principles are still applicable. The travelling times are used as inputs of a (modified) position calculation section 24, in which the position of the mobile unit is determined. The pre-determined altitude information used in the position calculation is retrieved from a memory 25. Preferably, the travelling time determination means 29 and the position calculation section 24 are preferably comprised in the processor 26.

In this embodiment, arrival times of only two downlink signals are used for the positioning. Instead of using differences, an absolute synchronisation is used to calibrate the clock reference of the mobile unit to the base stations. Two travelling times are used together with the altitude information to obtain the three-dimensional position. Optionally, the determined position of the mobile unit 20 can eventually be transferred back to the base station 10:1, so that the communication system can make use of the position information. The entire position determination is performed within the mobile unit 20 itself.

The embodiment of FIGS. 8a–b can of course be modified according to the principles shown in FIGS. 6a–b and 7a–b.

The illustrated embodiments above are based on measurements on downlink signals. However, measures of uplink signals are also possible to use.

The present invention is particularly well suited for e.g. CDMA systems, in particular WCDMA systems. However, also other wireless communication system can utilise the basic ideas of the present invention. In WCDMA systems, round trip time measurements are available between the own base station and the mobile unit. Round trip time (RTT) measurement allows for determining a propagation time between the own base station and the mobile. In this way, the absolute distance between the base station and the mobile unit can be determined, by simply dividing by the speed of light.

Round trip time measurements from more than one base station is only available at soft handover, and can not generally be utilised. However, by combining one RTT measurements and e.g. OTDOA measurements, the number of necessary hearable base stations can be reduced by one. This means that using an RTT measurement from the own base station and arrival time measurements from the own base station and one additional base station is enough for determining two unknown parameters. By then adding the use of pre-determined altitude information according to the present invention opens up for 3D positioning by use of only the own base station and one neighbouring station. In case non-unique solutions exist, at least one additional neighbour base station is needed.

Figure 9:
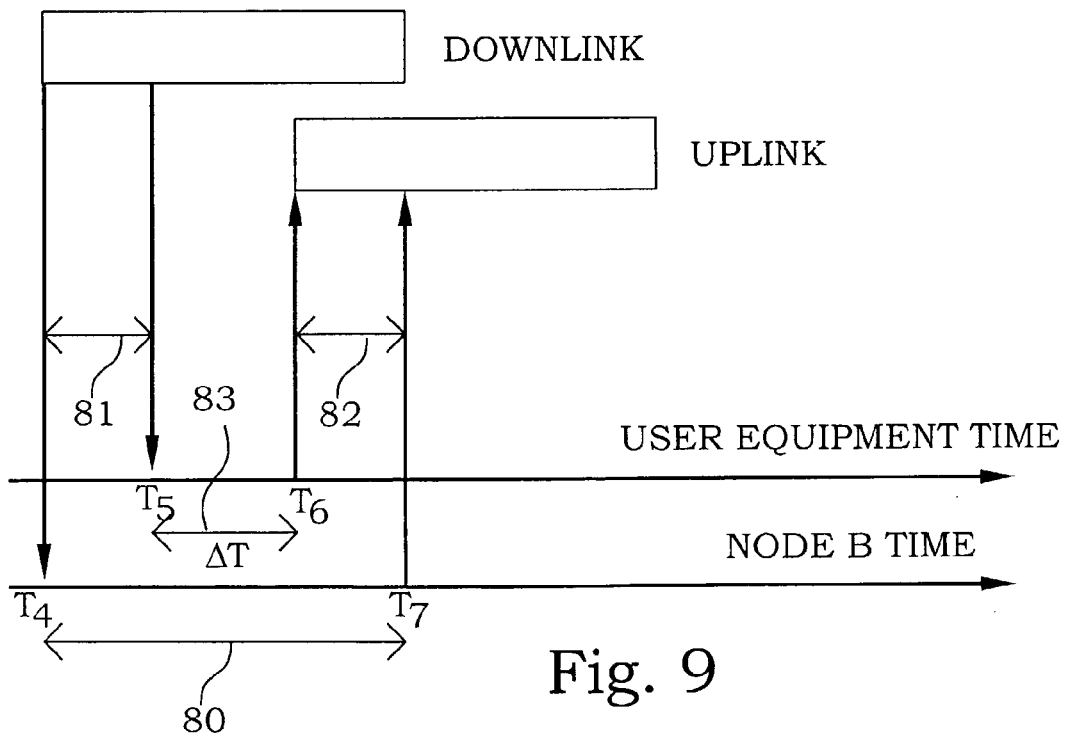
FIG. 9 illustrates the principles of round trip time measurements.

In e.g. a WCDMA system, round trip time measurements are available. This principle is schematically illustrated in FIG. 9, showing uplink and downlink frames. A downlink frame is transmitted from a node B at a time $T_4$. At time $T_5$, the first part of the frame is detected by the mobile unit. This occurs after the apparent propagation time 81. After a certain delay time $\Delta T$ 83, in this case the UE Rx-Tx time difference type 1, an uplink frame is transmitted at $T_6$ from the mobile unit. This time $\Delta T$ 83 is well defined in the system and can easily be measured by the mobile unit. The uplink frame is received at the node B after an apparent propagation time 82 at time $T_7$. The node B determines the total time 80 elapsed between $T_4$ and $T_7$, defined as the round trip time. By using the relation.

$$T_{pr}^{measured} = \frac{1}{2}(T_7 - T_4 - \Delta T)$$

an absolute travelling or propagation time $$T_{pr}^{measured}$$

between the node B and the mobile unit can be calculated. Division by the speed of light gives the distance.

The position calculation equations are then altered to (in the condition augment version):

$$\begin{pmatrix} \hat{x}_{UE} \\ \hat{y}_{UE} \\ \hat{z}_{UE} \end{pmatrix} = \underset{x_{UE}, y_{UE}, z_{UE}}{\mathrm{argmin}} \; V(x_{UE}, y_{UE}, z_{UE}), \text{ subject to } z_{UE} = GIS(x_{UE}, y_{UE}),$$

where $$V(x_{UE}, y_{UE}, z_{UE}) = \sum_{i=2}^{n} (OTD_{iI}^{measured} - OTD_{iI}^{aug}(x_{UE}, y_{UE}, z_{UE}))^2 +$$

$$k(T_{pr}^{measured} - T_{pr}^{aug}(x_{UE}, y_{UE}, z_{UE}))^2$$

and $$T_{pr}^{aug}(x_{UE}, y_{UE}, z_{UE}) = \frac{\sqrt{(x_1 - x_{UE})^2 + (y_1 - y_{UE})^2 + (z_1 - z_{UE})^2}}{c}.$$

k is a pre-determined scale factor. Also here, insertion in the OTDOA and propagation time equations is an alternative way of calculating the position:

$$\begin{pmatrix} \hat{x}_{UE} \\ \hat{y}_{UE} \end{pmatrix} = \underset{x_{UE}, y_{UE}}{\mathrm{argmin}} V(x_{UE}, y_{UE}),$$

where $$V(x_{UE}, y_{UE}) = \sum_{i=2}^{n} (OTD_{iI}^{measured} - OTD_{iI}^{ins}(x_{UE}, y_{UE}))^2 +$$

$$k(T_{pr}^{measured} - T_{pr}^{aug}(x_{UE}, y_{UE}))^2$$

and $$T_{pr}^{aug}(x_{UE}, y_{UE}) = \frac{\sqrt{(x_1 - x_{UE})^2 + (y_1 - y_{UE})^2 + (z_1 - GIS(x_{UE}, y_{UE}))^2}}{c}.$$

k is a pre-determined scale factor.

Figure 10A:
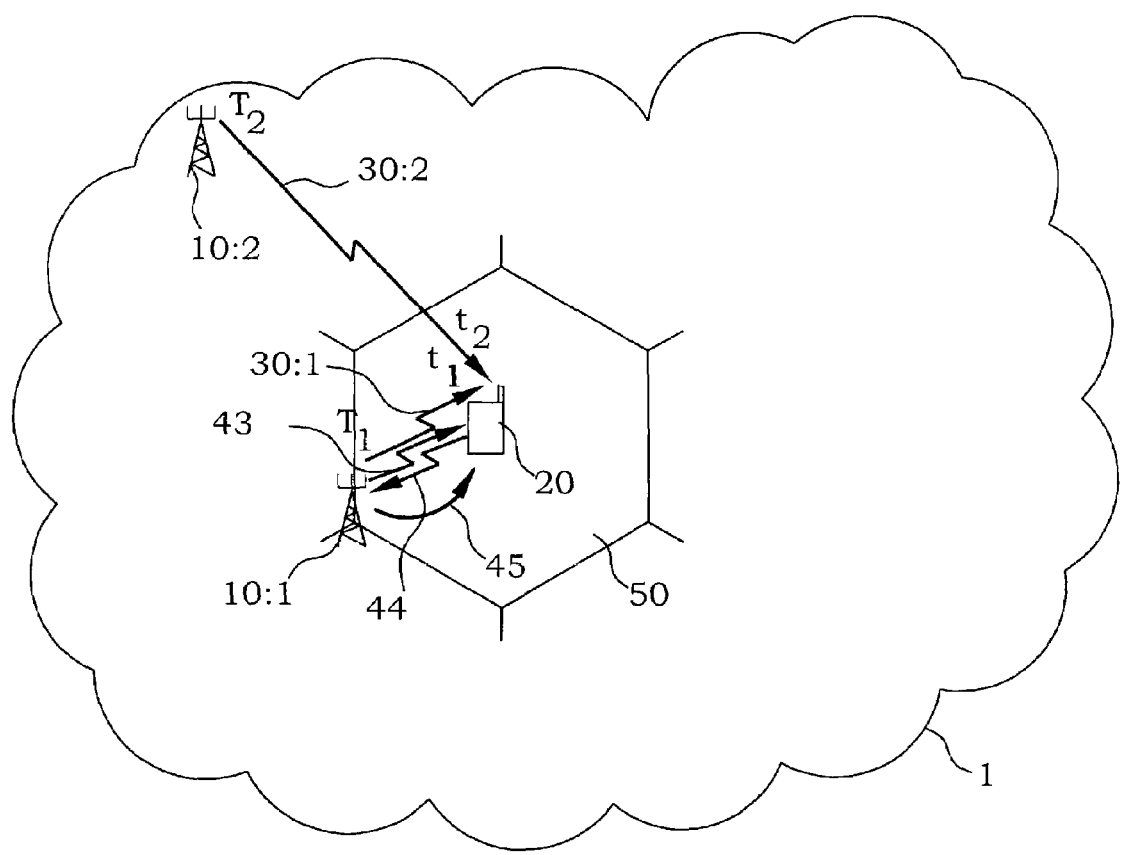
FIG. 10a illustrates an embodiment of a wireless communication system according to the present invention, performing provisional positioning calculations involving RTT measurements.

FIG. 10a illustrates an embodiment of a WCDMA system 1, having only two node B's 10:1, 10:2, within hearability distance from the mobile unit 20. A round trip time measurement is performed between the own node B 10:1 and the mobile unit 20. The result is communicated to the mobile unit. Additionally, points of arrival times are detected for downlink signals from the own node B 10:1 and one neighbouring node B 10:2.

Figure 10B:
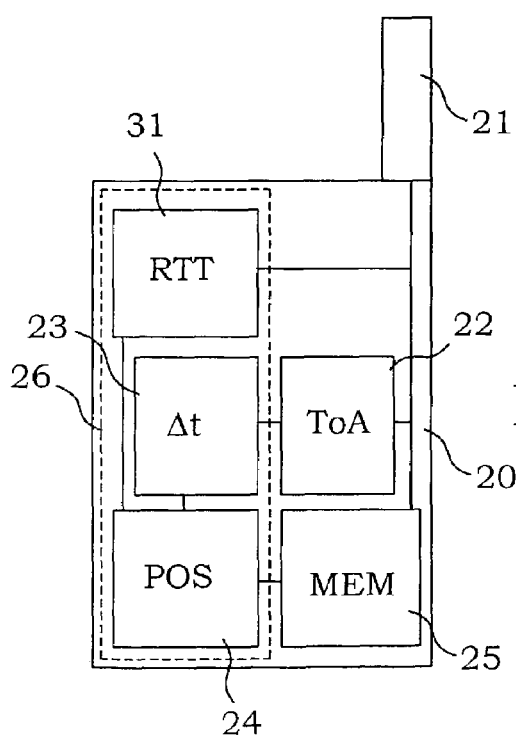

In FIG. 10b, a block diagram of an embodiment of relevant parts of a mobile unit 20 used in FIG. 10a is illustrated. Most parts of the mobile unit 20 are in analogy with the mobile unit of FIG. 5b, and only the differences will be commented on. An RTT (and UE Rx-Tx time difference type 1) determination means 31 is comprised in the processor 26. The RTT determination means 31 is responsible for measuring the delay time within the mobile in connection with the RTT measurement, i.e. the UE Rx-Tx type 1 time difference. The RTT determination means 31 is also responsible for transferring RTT information provided by the own node B and the own measurement of the delay time within the mobile unit into an absolute travelling or true propagation time. This propagation time is then used in the position calculation section 24 instead of one arrival time difference. Other parts are in analogy with FIG. 5b.

As mentioned further above, a general case when an intersection between three surfaces in a three-dimensional space is searched for, multiple solutions may be found. When determining positions, additional information has to be added in order to remove the false solutions. One obvious possibility is to include more measurements, i.e. the need for hearable base stations increases. In cases where there are no additional available base stations, other measures have to be taken.

In many practical situations, in particular when directional antennas are used, information about the cell extent may be enough to resolve any multiple solutions. Since the system knows in what cell the mobile unit presently is situated, any solutions falling outside the cell boundaries may be discarded. Also, when a mobile unit is in the state of handover, it is implicitly known that the mobile is situated relatively close to a cell boundary. Other solutions can then be sorted out. Furthermore, if positioning is performed relatively frequently, a new position in the vicinity of the previous one is more probable than a distant position. By keeping track of the mobile unit position, false solutions can be avoided.

Figure 11:
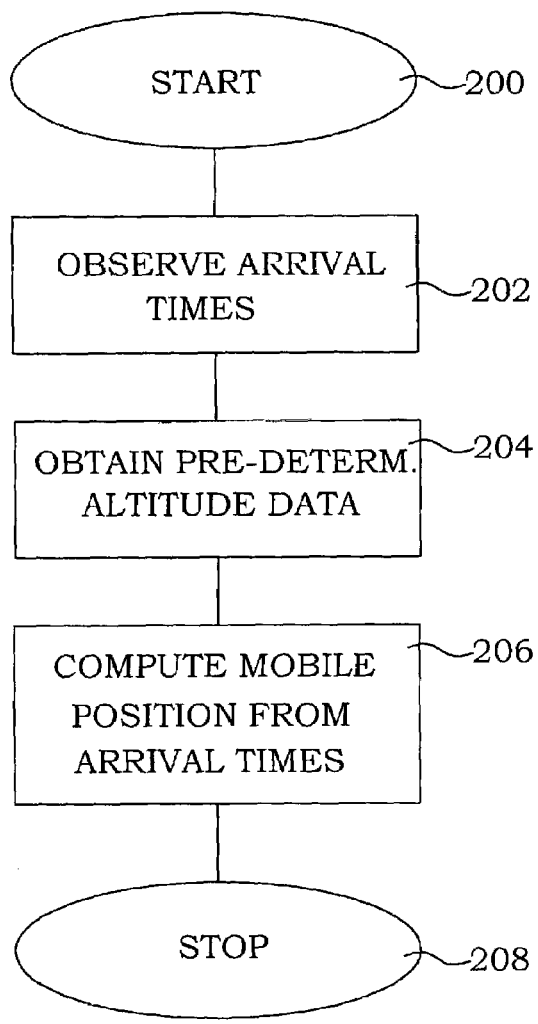
FIG. 11 is a flow diagram illustrating an embodiment of a method according to the present invention.

An embodiment of a method according to the present invention using only arrival time measurements is illustrated by the flow diagram in FIG. 11. The procedure begins in step 200. In step 202, a number n of arrival times are observed. The arrival times are associated with signals between nodes and a mobile unit. Pre-determined altitude data is obtained in step 204. The data represents estimated altitude of the mobile unit as a function of lateral position. In step 206, a position of the mobile unit is computed. This is performed by numerically optimising relations that are based on the determined arrival times. The optimisation is performed with the pre-determined altitude data as constraints. The process is ended in step 208.

Figure 12:
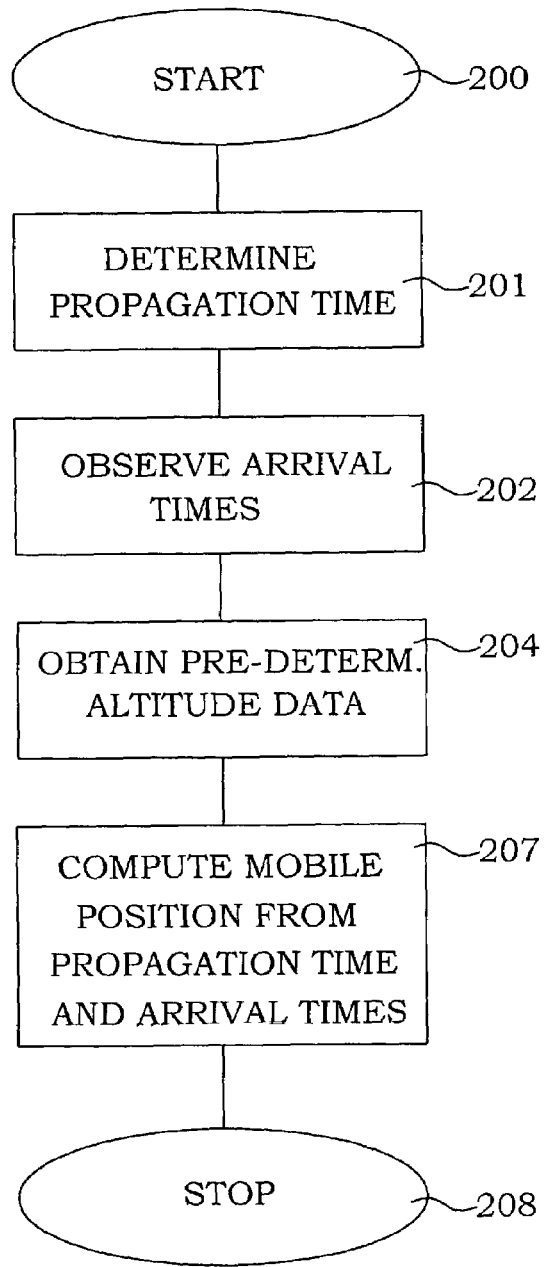
FIG. 12 is a flow diagram illustrating another embodiment of a method according to the present invention.

An embodiment of a method according to the present invention using arrival time measurements as well as RTT determination is illustrated by the flow diagram in FIG. 12. The procedure begins in step 200. In step 201 a total travelling time forth and back, a round trip time, between the mobile unit and a node is determined. A delay time is subtracted in order to calculate an absolute propagation time. In step 202, a number n of arrival times of one-way signals are determined. The arrival times are associated with signals between nodes and a mobile unit. Pre-determined altitude data is obtained in step 204. The data represents estimated altitude of the mobile unit as a function of lateral position. In step 207, a position of the mobile unit is computed. This is performed by numerically optimising relations that are based on the determined arrival times as well as on the propagation time. The optimisation is performed with the pre-determined altitude data as constraints. The process is ended in step 208.

The minimisation or optimisation in the above methods can be performed by any suitable optimisation method. To mention a few, a gradient search method, a Newton search method, a Bayesian method like the extended Kalman filter, or a simplex method may be used. In the simulations above the Nelder-Mead simplex method that is available in MATLAB is used.

It will be understood by those skilled in the art that various modifications and changes may be made to the present invention without departure from the scope thereof, which is defined by the appended claims.

The invention claimed is:

1. Method for determining mobile unit position in a wireless communication system, comprising the steps of:
   observing points of arrival time of signals between a number n of nodes and a mobile unit, where $n \geq 2$;
   obtaining pre-determined altitude data representing one unique estimated altitude of said mobile unit as a function of lateral position; and
   computing a position of said mobile by numerically optimizing relations having said points of arrival time as parameters using said pre-determined altitude data as constraints.

2. Method according to claim 1, wherein said position is a position in three coordinates.

3. Method according to claim 2, wherein said signals are downlink signals, whereby said observing step is performed in said mobile unit.

4. Method according to claim 3, wherein said wireless communication system is a WCDMA system and observations of said points of arrival times of signals transmitted from nodes of a cell different from the cell of said mobile unit are performed during idle periods of downlink transmission from the node of said cell of said mobile unit.

5. Method according to claim 3, wherein said obtaining and computing steps are performed in said mobile unit.

6. Method according to claim 5, wherein said obtaining step includes transferring said pre-determined altitude data from one of said nodes to said mobile unit.

7. Method according to claim 5, wherein $n \geq 3$: and said computing step includes calculating n−1 differences in point of arrival times between pairs of said signals, said method further comprising the step of:
   obtaining transmission time data associated with said signals;
   said transmission time data representing a transmission time from a respective transmitting node relative to a system time reference;
   whereby said transmission time data is used in said computing step.

8. Method according to claim 7, wherein said computing step is performed according to:

$$\begin{pmatrix} \hat{x}_{UE} \\ \hat{y}_{UE} \\ \hat{z}_{UE} \end{pmatrix} = \underset{x_{UE}, y_{UE}, z_{UE}}{\mathrm{argmin}}\ V(x_{UE}, y_{UE}, z_{UE}),\ \text{subject to}\ z_{UE} = GIS(x_{UE}, y_{UE}),$$

where $GIS(x_{UE}, Y_{UE})$ is said pre-determined altitude data, $$V(x_{UE}, y_{UE}, z_{UE}) = \sum_{i=2}^{n} (OTD_{il}^{measured} - OTD_{il}^{aug}(x_{UE}, y_{UE}, z_{UE}))^2,$$

$$OTD_{21}^{aug}(x_{UE}, y_{UE}, z_{UE}) = T_2 - T_1 + \frac{\sqrt{(x_2 - x_{UE})^2 + (y_2 - y_{UE})^2 + (z_2 - z_{UE})^2}}{c} - \frac{\sqrt{(x_1 - x_{UE})^2 + (y_1 - y_{UE})^2 + (z_1 - z_{UE})^2}}{c}$$

$$\vdots$$

$$OTD_{nl}^{aug}(x_{UE}, y_{UE}, z_{UE}) = T_n - T_1 + \frac{\sqrt{(x_n - x_{UE})^2 + (y_n - y_{UE})^2 + (z_n - z_{UE})^2}}{c} - \frac{\sqrt{(x_1 - x_{UE})^2 + (y_1 - y_{UE})^2 + (z_1 - z_{UE})^2}}{c}$$

$$OTD_{i1}^{measured}, i = 2, \ldots, n$$

are said differences in point of arrival times, and $x_1, \ldots, x_n$, $y_1 \ldots y_n$, $z_1, \ldots, z_n$ are coordinates of said nodes.

9. Method according to claim 7, wherein said computing step is performed according to:

$$\begin{pmatrix} \hat{x}_{UE} \\ \hat{y}_{UE} \end{pmatrix} = \arg\min_{x_{UE}, y_{UE}} V(x_{UE}, y_{UE}), \quad \text{where } V(x_{UE}, y_{UE}) = \sum_{i=2}^{n} (OTD_{i1}^{measured} - OTD_{i1}^{ins}(x_{UE}, y_{UE}))^2$$

$$OTD_{21}^{ins}(x_{UE}, y_{UE}) = T_2 - T_1 + \frac{\sqrt{(x_2 - x_{UE})^2 + (y_2 - y_{UE})^2 + (z_2 - GIS(x_{UE}, y_{UE}))^2}}{c} - \frac{\sqrt{(x_1 - x_{UE})^2 + (y_1 - y_{UE})^2 + (z_1 - GIS(x_{UE}, y_{UE}))^2}}{c}$$

$$\vdots$$

$$OTD_{n1}^{ins}(x_{UE}, y_{UE}) = T_n - T_1 + \frac{\sqrt{(x_n - x_{UE})^2 + (y_n - y_{UE})^2 + (z_n - GIS(x_{UE}, y_{UE}))^2}}{c} - \frac{\sqrt{(x_1 - x_{UE})^2 + (y_1 - y_{UE})^2 + (z_1 - GIS(x_{UE}, y_{UE}))^2}}{c},$$

where $GIS(x_{UE}, Y_{UE})$ is said pre-determined altitude data, $$OTD_{i1}^{measured}, i = 2, \ldots, n$$

are said differences in point of arrival times, and $x_1, \ldots, x_n$, $y_1, \ldots, y_n$, $z_1, \ldots, z_n$ are coordinates of said nodes.

10. Method according to claim 3, further comprising the steps of:
   synchronizing said mobile unit with a system time reference; and
   obtaining transmission time data associated with said signals;
   said transmission time data representing a transmission time from a respective transmitting node relative to said system time reference;
   whereby said computing step comprises the step of calculating an absolute travelling time of said signals between the respective transmitting node and said mobile unit.

11. Method according to claim 3, wherein said computing step in turn comprises a preliminary determining step and a correcting step;
   said preliminary determining step being performed in said mobile unit including computing an estimate of said position of said mobile by numerically optimising relations having said points of arrival time as parameters;
   said correcting step being performed in a processing node in said wireless communication system including computing said position from said estimate using said pre-determined altitude data as constraints;
   said obtaining step being performed in said processing node;
   said method further comprising the step of transferring said estimate between said mobile unit and said processing node.

12. Method according to claim 11, further comprising the step of collecting identity information about said nodes, whereby said identity information is used in said correcting step.

13. Method according to claim 12, wherein said step of collecting in turn comprises the step of performing a selection algorithm among nodes of said wireless communication system within range of said mobile unit.

14. Method according to claim 12, wherein $n \geq 3$, and said preliminary determining step in turn comprises the step of calculating n−1 differences in point of arrival times between pairs of said signals, said method further comprising the step of:

obtaining transmission time data associated with said signals;

said transmission time data representing a transmission time from a respective transmitting node relative to a system time reference;

whereby said transmission time data is used in said preliminary determining step and in said correcting step.

15. Method according to claim 14, wherein said correcting step is performed according to:

$$\begin{pmatrix} \hat{x}_{UE}^{3D} \\ \hat{y}_{UE}^{3D} \\ \hat{z}_{UE}^{3D} \end{pmatrix} = \arg\min_{x_{UE}^{3D}, y_{UE}^{3D}, z_{UE}^{3D}} V(x_{UE}^{3D}, y_{UE}^{3D}, z_{UE}^{3D}), \quad \text{subject to } z_{UE}^{3D} = GIS(x_{UE}, y_{UE}),$$

where $GIS(x_{UE}, Y_{UE})$ is said pre-determined altitude data, $$V(x_{UE}^{3D}, y_{UE}^{3D}, z_{UE}^{3D}) = \sum_{i=2}^{3} (OTD_{i1}^{comp} - OTD_{i1}^{aug}(x_{UE}^{3D}, y_{UE}^{3D}, z_{UE}^{3D}))^2.$$

-continued $$OTD_{21}^{aug}(x_{UE}^{3D}, y_{UE}^{3D}, z_{UE}^{3D}) = T_2 - T_1 +$$
$$\frac{\sqrt{(x_2 - x_{UE}^{3D})^2 + (y_2 - y_{UE}^{3D})^2 + (z_2 - z_{UE}^{3D})^2}}{c} -$$
$$\frac{\sqrt{(x_1 - x_{UE}^{3D})^2 + (y_1 - y_{UE}^{3D})^2 + (z_1 - z_{UE}^{3D})^2}}{c}$$

$$OTD_{31}^{aug}(x_{UE}^{3D}, y_{UE}^{3D}, z_{UE}^{3D}) = T_3 - T_1 +$$
$$\frac{\sqrt{(x_3 - x_{UE}^{3D})^2 + (y_3 - y_{UE}^{3D})^2 + (z_3 - z_{UE}^{3D})^2}}{c} -$$
$$\frac{\sqrt{(x_1 - x_{UE}^{3D})^2 + (y_1 - y_{UE}^{3D})^2 + (z_1 - z_{UE}^{3D})^2}}{c}$$

$$OTD_{21}^{comp}(x_{UE}^{2D}, y_{UE}^{2D},) = T_2 - T_1 + \frac{\sqrt{(x_2 - x_{UE}^{2D})^2 + (y_2 - y_{UE}^{2D})^2}}{c} - \frac{\sqrt{(x_1 - x_{UE}^{2D})^2 + (y_1 - y_{UE}^{2D})^2}}{c}$$

$$OTD_{31}^{comp}(x_{UE}^{2D}, y_{UE}^{2D},) = T_3 - T_1 + \frac{\sqrt{(x_3 - x_{UE}^{2D})^2 + (y_3 - y_{UE}^{2D})^2}}{c} - \frac{\sqrt{(x_1 - x_{UE}^{2D})^2 + (y_1 - y_{UE}^{2D})^2}}{c}$$

$x_{UE}^{2D}, y_{UE}^{2D}$ are said estimate, and $x_1$, $x_2$, $x_3$, $y_1$, $y_2$, $y_3$, $z_1$, $z_2$, $z_3$ are coordinates of said nodes.

16. Method according to claim 14, wherein said correcting step is performed according to:

$$\begin{pmatrix} \hat{x}_{UE}^{3D} \\ \hat{y}_{UE}^{3D} \end{pmatrix} = \underset{x_{UE}^{3D}, y_{UE}^{3D}}{\operatorname{argmin}} V(x_{UE}^{3D}, y_{UE}^{3D}),$$

where $$V(x_{UE}^{3D}, y_{UE}^{3D}) = \sum_{i=2}^{3} (OTD_{i1}^{comp} - OTD_{i1}^{ins}(x_{UE}^{3D}, y_{UE}^{3D}))^2$$

$$OTD_{21}^{ins}(x_{UE}^{3D}, y_{UE}^{3D}) = T_2 - T_1 +$$
$$\frac{\sqrt{(x_2 - x_{UE}^{3D})^2 + (y_2 - y_{UE}^{3D})^2 + (z_2 - GIS(x_{UE}^{3D}, y_{UE}^{3D}))^2}}{c} -$$
$$\frac{\sqrt{(x_1 - x_{UE}^{3D})^2 + (y_1 - y_{UE}^{3D})^2 + (z_1 - GIS(x_{UE}^{3D}, y_{UE}^{3D}))^2}}{c}$$

$$OTD_{31}^{ins}(x_{UE}^{3D}, y_{UE}^{3D}) = T_3 - T_1 +$$
$$\frac{\sqrt{(x_3 - x_{UE}^{3D})^2 + (y_3 - y_{UE}^{3D})^2 + (z_3 - GIS(x_{UE}^{3D}, y_{UE}^{3D}))^2}}{c} -$$

-continued
$$\frac{\sqrt{(x_1 - x_{UE}^{3D})^2 + (y_1 - y_{UE}^{3D})^2 + (z_1 - GIS(x_{UE}^{3D}, y_{UE}^{3D}))^2}}{c},$$

$GIS(x_{UE}, Y_{UE})$ is said pre-determined altitude data, $$OTD_{21}^{comp}(x_{UE}^{2D}, y_{UE}^{2D}) = T_2 - T_1 +$$
$$\frac{\sqrt{(x_2 - x_{UE}^{2D})^2 + (y_2 - y_{UE}^{2D})^2}}{c} - \frac{\sqrt{(x_1 - x_{UE}^{2D})^2 + (y_1 - y_{UE}^{2D})^2}}{c}$$

$$OTD_{31}^{comp}(x_{UE}^{2D}, y_{UE}^{2D}) = T_3 - T_1 +$$
$$\frac{\sqrt{(x_3 - x_{UE}^{2D})^2 + (y_3 - y_{UE}^{2D})^2}}{c} - \frac{\sqrt{(x_1 - x_{UE}^{2D})^2 + (y_1 - y_{UE}^{2D})^2}}{c}$$

$x_{UE}^{2D}, y_{UE}^{2D}$ are said estimates, and $x_1$, $x_2$, $x_3$, $y_1$, $y_2$, $y_3$, $z_1$, $z_2$, $z_3$ are coordinates of said nodes.

17. Method according to claim 3, further comprising the step of transferring data representing said observed points of arrival time from said mobile unit to a processing node in said wireless communication system, where at least a part of said obtaining and computing steps is performed in said processing node.

18. Method according to claim 17, wherein $n \geq 3$: and said data representing said observed points of arrival time are differences between points of arrival time.

19. Method according to claim 17, wherein said data representing said observed points of arrival time are actual points of arrival time.

20. Method according to claim 19, wherein $n \geq 3$, and said computing step in turn comprises the step of calculating $n-1$ differences in point of arrival times between pairs of said signals.

21. Method according to claim 20, further comprising the step of:
obtaining transmission time data associated with said signals;
said transmission time data representing a transmission time from respective transmitting node relative to a system time reference;
whereby said transmission time data is used in said computing step.

22. Method according to claim 21, wherein said computing step is performed according to:

$$\begin{pmatrix} \hat{x}_{UE} \\ \hat{y}_{UE} \\ \hat{z}_{UE} \end{pmatrix} = \underset{x_{UE}, y_{UE}, z_{UE}}{\arg \min} V(x_{UE}, y_{UE}, z_{UE}), \quad \text{subject to } z_{UE}^{3D} = GIS(x_{UE}, y_{UE}),$$

where $GIS(x_{UE}, Y_{UE})$ is said pre-determined altitude data, $$V(x_{UE}, y_{UE}, z_{UE}) = \sum_{i=2}^{n} (OTD_{i1}^{measured} - OTD_{i1}^{aug}(x_{UE}, y_{UE}, z_{UE}))^2,$$

$$OTD_{21}^{aug}(x_{UE}, y_{UE}, z_{UE}) = T_2 - T_1 + \frac{\sqrt{(x_2 - x_{UE})^2 + (y_2 - y_{UE})^2 + (z_2 - z_{UE})^2}}{c} - \frac{\sqrt{(x_1 - x_{UE})^2 + (y_1 - y_{UE})^2 + (z_1 - z_{UE})^2}}{c}$$

$$\vdots$$

$$OTD_{n1}^{aug}(x_{UE}, y_{UE}, z_{UE}) = T_n - T_1 + \frac{\sqrt{(x_n - x_{UE})^2 + (y_n - y_{UE})^2 + (z_n - z_{UE})^2}}{c} - \frac{\sqrt{(x_1 - x_{UE})^2 + (y_1 - y_{UE})^2 + (z_1 - z_{UE})^2}}{c}$$

$$OTD_{i1}^{measured}, i = 2, \ldots, n$$

are said differences in point arrival times, and $x_1, \ldots, x_n$, $y_1, \ldots, y_n, z_1, \ldots, z_n$ are coordinates of said nodes.

23. Method according to claim 21, wherein said computing step is performed according to:

$$\begin{pmatrix} \hat{x}_{UE} \\ \hat{y}_{UE} \end{pmatrix} = \underset{x_{UE}, y_{UE}}{\arg\min} V(x_{UE}, y_{UE}),$$

where $$V(x_{UE}, y_{UE}) = \sum_{i=2}^{n} (OTD_{i1}^{measured} - OTD_{i1}^{ins}(x_{UE}, y_{UE}))^2$$

$$OTD_{21}^{ins}(x_{UE}, y_{UE}) = T_2 - T_1 + \frac{\sqrt{(x_2 - x_{UE})^2 + (y_2 - y_{UE})^2 + (z_2 - GIS(x_{UE}, y_{UE}))^2}}{c} - \frac{\sqrt{(x_1 - x_{UE})^2 + (y_1 - y_{UE})^2 + (z_1 - GIS(x_{UE}, y_{UE}))^2}}{c}$$

$$\vdots$$

$$OTD_{n1}^{ins}(x_{UE}, y_{UE}) = T_n - T_1 + \frac{\sqrt{(x_n - x_{UE})^2 + (y_n - y_{UE})^2 + (z_n - GIS(x_{UE}, y_{UE}))^2}}{c} - \frac{\sqrt{(x_1 - x_{UE})^2 + (y_1 - y_{UE})^2 + (z_1 - GIS(x_{UE}, y_{UE}))^2}}{c},$$

where $GIS(x_{UE}, y_{UE})$ is said pre-determined altitude data, $$OTD_{i1}^{measured}, i = 2, \ldots, n$$

are said differences in point of arrival times, and $x_1, \ldots, x_n$, $y_1, \ldots, y_n, z_1, \ldots, z_n$ are coordinates of said nodes.

24. Method according to claim 17, further comprising the steps of:
synchronizing said mobile unit with a system time reference; and
obtaining transmission time data associated with said signals;
said transmission time data representing a transmission time from a respective transmitting node relative to said system time reference;
whereby said computing step comprises the step of calculating an absolute travelling time of said signals between the respective transmitting node and said mobile unit.

25. Method according to claim 17, wherein said processing node is a node selected from the list of:
base station;
node B; and
radio network controller.

26. Method according to claim 2, wherein said signals are uplink signals, whereby said observing step is performed in said nodes.

27. Method for determining mobile unit position in a wireless communication system, comprising the steps of:
observing points of arrival time of signals between a number n of nodes and a mobile unit, where n≧2;
obtaining pre-determined altitude data representing one unique estimated altitude of said mobile unit as a function of lateral position;
computing a lateral position of said mobile by numerically optimizing relations having said points of arrival time as parameters;
adding an altitude to said lateral position to generate a three-dimensional position; and
using said pre-determined altitude data associated with said computed lateral position.

28. Method for determining mobile unit position in a wireless communication system, comprising the steps of:
determining a propagation time between a first node and a mobile unit using an initial signal and a response signal transferred forth and back between said first node and said mobile unit;
observing points of arrival time of one-way signals between a number n of communication nodes and said mobile unit, where n≧2, said communication nodes comprise said first node;
obtaining pre-determined altitude data representing one unique estimated altitude of said mobile unit as a function of lateral position; and
computing a position of said mobile by numerically optimizing relations having said points of arrival time and said propagation time as parameters using said pre-determined altitude data as constraints.

29. Method according to claim 28, wherein said determining step comprises determination of a round trip time, corresponding to the total time from transmission of said initial signal being from said first node to said mobile unit to reception of said response signal in said first node, and a delay time between reception of said initial signal in said mobile unit and transmission of said response signal, said round trip time being determined in said first node, said delay time being determined in said mobile unit, whereby said propagation time is computed as half the difference between said round trip time and said delay time.

30. Method according to claim 29, wherein n≧2, and said computing step in turn comprises the step of calculating n−1 differences of point of arrival times between pairs of said one-way signals, said method further comprising the step of:

obtaining transmission time data associated with said one-way signals;

said transmission time data representing a transmission time from respective transmitting communication node relative to a system time reference;

whereby said transmission time data is used in said computing step.

31. Method according to claim 30, wherein said computing step is performed according to:

$$\begin{pmatrix} \hat{x}_{UE} \\ \hat{y}_{UE} \\ \hat{z}_{UE} \end{pmatrix} = \arg\min_{x_{UE}, y_{UE}, z_{UE}} V(x_{UE}, y_{UE}, z_{UE}), \quad \text{subject to } z_{UE}^{3D} = GIS(x_{UE}, y_{UE}),$$

where $GIS(x_{UE}, Y_{UE})$ is said pre-determined altitude data, $$V(x_{UE}, y_{UE}, z_{UE}) = \sum_{i=2}^{n} (OTD_{i1}^{measured} - OTD_{i1}^{aug}(x_{UE}, y_{UE}, z_{UE}))^2 + k(T_{pr}^{measured} - T_{pr}^{aug}(x_{UE}, y_{UE}, z_{UE}))^2$$

$$OTD_{21}^{aug}(x_{UE}, y_{UE}, z_{UE}) = T_2 - T_1 + \frac{\sqrt{(x_2 - x_{UE})^2 + (y_2 - y_{UE})^2 + (z_2 - z_{UE})^2}}{c} - \frac{\sqrt{(x_1 - x_{UE})^2 + (y_1 - y_{UE})^2 + (z_1 - z_{UE})^2}}{c}$$

$$\vdots$$

$$OTD_{n1}^{aug}(x_{UE}, y_{UE}, z_{UE}) = T_n - T_1 + \frac{\sqrt{(x_n - x_{UE})^2 + (y_n - y_{UE})^2 + (z_n - z_{UE})^2}}{c} - \frac{\sqrt{(x_1 - x_{UE})^2 + (y_1 - y_{UE})^2 + (z_1 - z_{UE})^2}}{c},$$

$$T_{pr}^{aug}(x_{UE}, y_{UE}, z_{UE}) = \frac{\sqrt{(x_1 - x_{UE})^2 + (y_1 - y_{UE})^2 + (z_1 - z_{UE})^2}}{c},$$

$$OTD_{i1}^{measured}, i = 2, \ldots, n$$

are said differences in point of arrival times $$T_{pr}^{measured}$$

is said propagation time, k a pre-determined scale factor and $x_1, \ldots, x_n, y_1, \ldots, y_n, z_1, \ldots, z_n$, are coordinates of said nodes.

32. Method according to claim 30, wherein said computing step is performed according to:

$$\begin{pmatrix} \hat{x}_{UE} \\ \hat{y}_{UE} \end{pmatrix} = \arg\min_{x_{UE}, y_{UE}} V(x_{UE}, y_{UE}), \text{ where}$$

$$V(x_{UE}, y_{UE}) = \sum_{i=2}^{n} (OTD_{i1}^{measured} - OTD_{i1}^{ins}(x_{UE}, y_{UE}))^2 + k(T_{pr}^{measured} - T_{pr}^{aug}(x_{UE}, y_{UE}))^2$$

$$OTD_{21}^{ins}(x_{UE}, y_{UE}) = T_2 - T_1 + \frac{\sqrt{(x_2 - x_{UE})^2 + (y_2 - y_{UE})^2 + (z_2 - GIS(x_{UE}, y_{UE}))^2}}{c} - \frac{\sqrt{(x_1 - x_{UE})^2 + (y_1 - y_{UE})^2 + (z_1 - GIS(x_{UE}, y_{UE}))^2}}{c}$$

$$\vdots$$

$$OTD_{n1}^{ins}(x_{UE}, y_{UE}) = T_n - T_1 + \frac{\sqrt{(x_n - x_{UE})^2 + (y_n - y_{UE})^2 + (z_n - GIS(x_{UE}, y_{UE}))^2}}{c} - \frac{\sqrt{(x_1 - x_{UE})^2 + (y_1 - y_{UE})^2 + (z_1 - GIS(x_{UE}, y_{UE}))^2}}{c},$$

$$T_{pr}^{aug}(x_{UE}, y_{UE}) = \frac{\sqrt{(x_1 - x_{UE})^2 + (y_1 - y_{UE})^2 + (z_1 - GIS(x_{UE}, y_{UE}))^2}}{c}$$

where $GIS(x_{UE}, Y_{UE})$ is said pre-determined altitude data, $$OTD_{i1}^{measured}, i = 2, \ldots, n$$

are said differences in point of arrival times, $$T_{pr}^{measured}$$

is said propagation time, k is a pre-determined scale factor and $x_1, \ldots, x_n, y_1, \ldots, y_n, z_1, \ldots, z_n$ are coordinates of said nodes.

33. Method according to claim 1, comprising the further step of resolving non-unique solutions of said relations using information about cell boundaries.

34. Node of a wireless communication system, comprising:

a receiver arranged for receiving data representing points of arrival time of signals between a number n of nodes of said wireless communication system and a mobile unit, where n≧2;

means for obtaining pre-determined altitude data representing one unique estimated altitude of said mobile unit as a function of lateral position; and computing circuitry, connected to said receiver and said means for obtaining pre-determined altitude data, for computing a position of said mobile by numerically optimizing relations having said points of arrival time as parameters using said pre-determined altitude data as constraints.

35. Node according to claim 34, wherein said computing means is arranged for calculating n−1 differences in point of arrival times between pairs of said signals, whereby said optimizing relations are based on said differences, said receiving means being further arranged to receive transmission time data associated with said signals, said transmission time data representing a transmission time from respective transmitting node relative to a system time reference, whereby said computing circuitry is arranged to use said transmission time data.

36. Node according to claim 34, wherein said computing circuitry is further arranged to resolve non-unique solutions of said relations using information about cell boundaries.

37. Node according to claim 34, wherein said receiver is further arranged to receive data representing a propagation time between a first node and said mobile unit using an initial signal and a response signal transferred forth and back between said first node and said mobile unit, whereby said optimizing relations are further based on said propagation time.

38. Node of a wireless communication system, comprising:
   a receiver arranged for receiving a preliminary two-dimensional position of a mobile unit;
   means for obtaining pre-determined altitude data representing one unique estimated altitude of said mobile unit as a function of lateral position; and
   correcting circuitry connected to said receiver and said means for obtaining pre-determined altitude data, for computing a three-dimensional position of said mobile by numerically optimizing relations having said two-dimensional position as parameters using said pre-determined altitude data as constraints.

39. Node according to claim 34, wherein said node is selected from the list of:
   base station;
   node B; and
   radio network controller.

40. Wireless communication system, comprising:
   a number n of nodes, where $n \geq 2$;
   a mobile unit;
   means for observing points of arrival time of signals between said nodes and said mobile unit;
   means for obtaining pre-determined altitude data representing estimated altitude of said mobile unit as a function of lateral position;
   computing means, connected to said means for observing points of arrival time and said means for obtaining pre-determined altitude data, for computing a position of said mobile by numerically optimising relations having said points of arrival time as parameters using said pre-determined altitude data as constraints.

41. Wireless communication system according to claim 40, wherein at least a part of said computing means is comprised in a processing node, selected from the list of:
   base station;
   node B; and
   radio network controller.

42. Wireless communication system, comprising:
   a number n of nodes, where $n \geq 2$;
   a mobile unit;
   means for determining a propagation time between a first node and said mobile unit using an initial signal and a response signal transferred forth and back between said first node and said mobile unit;
   means for observing points of arrival time of signals between said nodes and said mobile unit;
   means for obtaining pre-determined altitude data representing one unique estimated altitude of said mobile unit as a function of lateral position;
   computing means, connected to said means for observing points of arrival time and said means for obtaining pre-determined altitude data, for computing a position of said mobile by numerically optimising relations having said points of arrival time and said propagation time as parameters using said pre-determined altitude data as constraints.

43. Wireless communication system according to claim 40, wherein said wireless communication system is based on WCDMA and said means for observing is arranged to perform observations of points of arrival times of signals transmitted from nodes of a cell different from the cell of said mobile unit during idle periods of downlink transmission from the node of said cell of said mobile unit.

44. Mobile unit arranged for allowing communication via a wireless communication system, comprising electronic processing circuitry configured to:
   observe points of arrival time of signals between a number n of nodes of said wireless communication system and said mobile unit, where $n \geq 2$;
   obtain pre-determined altitude data representing one unique estimated altitude of said mobile unit as a function of lateral position; and
   compute a position of said mobile by numerically optimizing relations having said points of arrival time as parameters using said pre-determined altitude data as constraints.

45. The method in claim 1, wherein a lateral position of said computed position is dependent on said pre-determined altitude data.

46. The method in claim 27, wherein a lateral position of said computed position is dependent on said pre-determined altitude data.

47. The method in claim 28, wherein a lateral position of said computed position is dependent on said pre-determined altitude data.

48. The node in claim 34, wherein a lateral position of said computed position is dependent on said pre-determined altitude data.

49. The node in claim 38, wherein a lateral position of said computed position is dependent on said pre-determined altitude data.

50. The system in claim 40, wherein a lateral position of said computed position is dependent on said pre-determined altitude data.

51. The system in claim 42, wherein a lateral position of said computed position is dependent on said pre-determined altitude data.

52. The mobile unit in claim 44, wherein a lateral position of said computed position is dependent on said pre-determined altitude data.

* * * * *

UNITED STATES PATENT AND TRADEMARK OFFICE
CERTIFICATE OF CORRECTION

PATENT NO. : 7,203,499 B2
APPLICATION NO. : 10/146126
DATED : April 10, 2007
INVENTOR(S) : Wigren It is certified that error appears in the above-identified patent and that said Letters Patent is hereby corrected as shown below:

On the Title Page, in Field (56), under "FOREIGN PATENT DOCUMENTS", in Column 2, Line 2, delete "01/09125" and insert -- 01/19125 --, therefor.

In Column 1, Line 65, delete "$t_1$" and insert -- $t_i$ --, therefor.

In Column 2, Line 26, delete "$r_1$" and insert -- $r_i$ --, therefor.

In Column 6, Line 3, delete "argmin $V$" and insert -- arg min $V$ --, therefor at each occurrence throughout the Patent.

In Column 9, Line 1,
delete "$OTD_{21} = t_2 - t_1 = T_2 - T_1 + $ [1] $\|r_2 - r_{UE}\|/c - \|r_1 - r_{UE}\|/c$"
and insert -- $OTD_{21} = t_2 - t_1 = T_2 - T_1 + \|r_2 - r_{UE}\|/c - \|r_1 - r_{UE}\|/c$ --, therefor.

In Column 10, in equation above Line 53 reading "which are then solved as:", delete "$$OTD_{21}^{ins}(x_{UE}, y_{UE}) = T_2 - T_1 + \frac{\sqrt{(x_2 - x_{UE})^2 + (y_2 - y_{UE})^2 + (z_2 - GIS(x_{UE}, y_{UE}))^2}}{c} - \frac{\sqrt{(x_1 - x_{UE})^2 + (y_1 - y_{UE})^2 + (z_1 GIS(x_{UE}, y_{UE}))^2}}{c}$$" and insert -- $$OTD_{21}^{ins}(x_{UE}, y_{UE}) = T_2 - T_1 + \frac{\sqrt{(x_2 - x_{UE})^2 + (y_2 - y_{UE})^2 + (z_2 - GIS(x_{UE}, y_{UE}))^2}}{c} - \frac{\sqrt{(x_1 - x_{UE})^2 + (y_1 - y_{UE})^2 + (z_1 - GIS(x_{UE}, y_{UE}))^2}}{c}$$ --, therefor.

In Column 14, Line 38, delete "$GIS(x_{UE}, {}_{yUE})$" and insert -- $GIS(x_{UE}, y_{UE})$ --, therefor.

In Column 16, Line 52, delete "lime" and insert -- time --, therefor.

In Column 20, Line 46, in Claim 8, delete "$GIS(x_{UE}, Y_{UE})$" and insert -- $GIS(x_{UE}, y_{UE})$ --, therefor at each occurrence throughout the claims.

UNITED STATES PATENT AND TRADEMARK OFFICE
CERTIFICATE OF CORRECTION

PATENT NO.       : 7,203,499 B2
APPLICATION NO.  : 10/146126
DATED            : April 10, 2007
INVENTOR(S)      : Wigren It is certified that error appears in the above-identified patent and that said Letters Patent is hereby corrected as shown below:

In Column 24, Line 63, in Claim 22, delete " $z_{UE}^{3D}$ " and insert -- $Z_{UE}$ --, therefor.

In Column 27, Line 22, in Claim 31, delete " $z_{UE}^{3D}$ " and insert -- $Z_{UE}$ --, therefor.

Signed and Sealed this

Ninth Day of September, 2008

JON W. DUDAS
*Director of the United States Patent and Trademark Office*